US008806241B2

(12) United States Patent
Shimizu et al.

(10) Patent No.: US 8,806,241 B2
(45) Date of Patent: Aug. 12, 2014

(54) APPARATUS AND METHOD FOR SHORTENING THE TIME RETURNING FROM A POWER-SAVING MODE TO NORMAL POWER MODE AND REDUCING POWER CONSUMPTION IN THE POWER-SAVING MODE

(75) Inventors: Koji Shimizu, Tokyo (JP); Kohei Asano, Yokohama (JP); So Yokomizo, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 852 days.

(21) Appl. No.: 12/361,864

(22) Filed: Jan. 29, 2009

(65) Prior Publication Data
US 2009/0207423 A1 Aug. 20, 2009

(30) Foreign Application Priority Data

Feb. 19, 2008 (JP) .................................. 2008-037950
Mar. 25, 2008 (JP) .................................. 2008-078277

(51) Int. Cl.
*G06F 1/26* (2006.01)
*G06F 1/32* (2006.01)
*G06F 1/30* (2006.01)
*B41J 29/28* (2006.01)

(52) U.S. Cl.
CPC .. *G06F 1/26* (2013.01); *G06F 1/30* (2013.01); *G06F 1/32* (2013.01); *B41J 29/28* (2013.01)
USPC ......................................................... 713/320

(58) Field of Classification Search
CPC ............... G06F 1/32; G06F 1/26; G06F 1/30; G06F 3/12; B41J 29/28
USPC .......................................................... 713/320
See application file for complete search history.

(56) References Cited

U.S. PATENT DOCUMENTS

| 5,369,733 | A | | 11/1994 | Arimoto et al. |
| 5,673,392 | A | * | 9/1997 | Nakashima et al. .......... 708/203 |
| 5,977,954 | A | | 11/1999 | Arimoto et al. |
| 6,307,540 | B1 | | 10/2001 | Arimoto et al. |

(Continued)

FOREIGN PATENT DOCUMENTS

| CN | 101065734 A | | 10/2007 |
| EP | 1035499 A2 | * | 9/2000 |

(Continued)

OTHER PUBLICATIONS

Kino Masayuki, English Translation of JP2006221381.*

(Continued)

*Primary Examiner* — Thomas Lee
*Assistant Examiner* — Xuxing Chen
(74) *Attorney, Agent, or Firm* — Fitzpatrick, Cella, Harper & Scinto

(57) ABSTRACT

In an information processing apparatus which incorporates a plurality of arithmetic units and a plurality of storage units, power consumption in a power saving mode is reduced, and a return time required to return from the power saving mode to a normal power mode is shortened. With this invention, in an information processing method in an information processing apparatus which incorporates a plurality of CPUs and a plurality of RAMs, when a condition required to transit to the power saving mode is satisfied, each CPU stores information associated with an operation state of an active program in one RAM, and turns off the power supply to devices except for the one RAM.

8 Claims, 16 Drawing Sheets

(56) References Cited

U.S. PATENT DOCUMENTS

| | | | |
|---|---|---|---|
| 6,329,979 | B1 | 12/2001 | Arimoto et al. |
| 6,711,605 | B2 | 3/2004 | Sekiguchi et al. |
| 6,718,482 | B2 | 4/2004 | Sato et al. |
| 6,772,419 | B1 | 8/2004 | Sekiguchi et al. |
| 6,901,298 | B1 * | 5/2005 | Govindaraj et al. ............ 700/21 |
| 6,996,828 | B1 | 2/2006 | Kimura et al. |
| 7,594,073 | B2 * | 9/2009 | Hanebutte et al. ............ 711/113 |
| 2004/0237086 | A1 | 11/2004 | Sekiguchi et al. |
| 2005/0055591 | A1 * | 3/2005 | Cho ............................ 713/320 |
| 2006/0053325 | A1 | 3/2006 | Chary et al. |
| 2006/0277360 | A1 * | 12/2006 | Sutardja et al. ............... 711/113 |
| 2009/0113458 | A1 * | 4/2009 | Finger et al. ................. 719/327 |

FOREIGN PATENT DOCUMENTS

| | | |
|---|---|---|
| JP | 2005078197 | 3/2005 |
| JP | 2006-221381 A | 8/2006 |
| JP | 2007-026318 A | 2/2007 |
| JP | 2007025882 | 2/2007 |
| JP | 2007035066 | 2/2007 |

OTHER PUBLICATIONS

Notification of Second Office Action dated May 11, 2011, in counterpart Chinese Application No. 200910006586.1.

Office Action dated Apr. 17, 2012, in Japanese Appln. No. 2008-078277.

* cited by examiner

F I G. 4
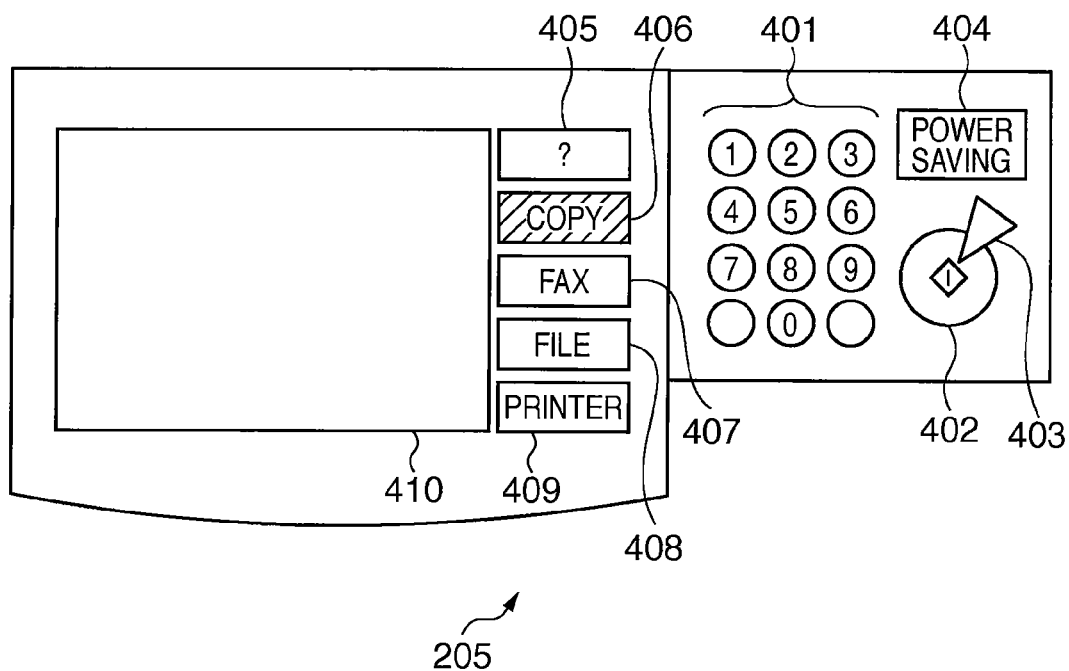

F I G. 5
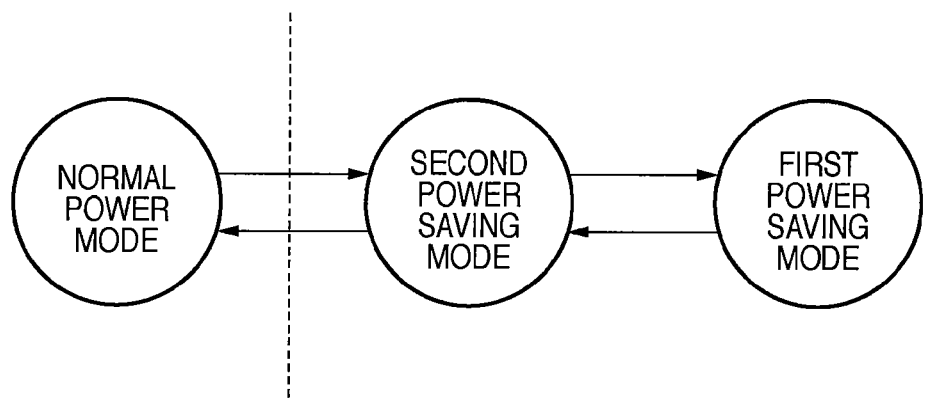

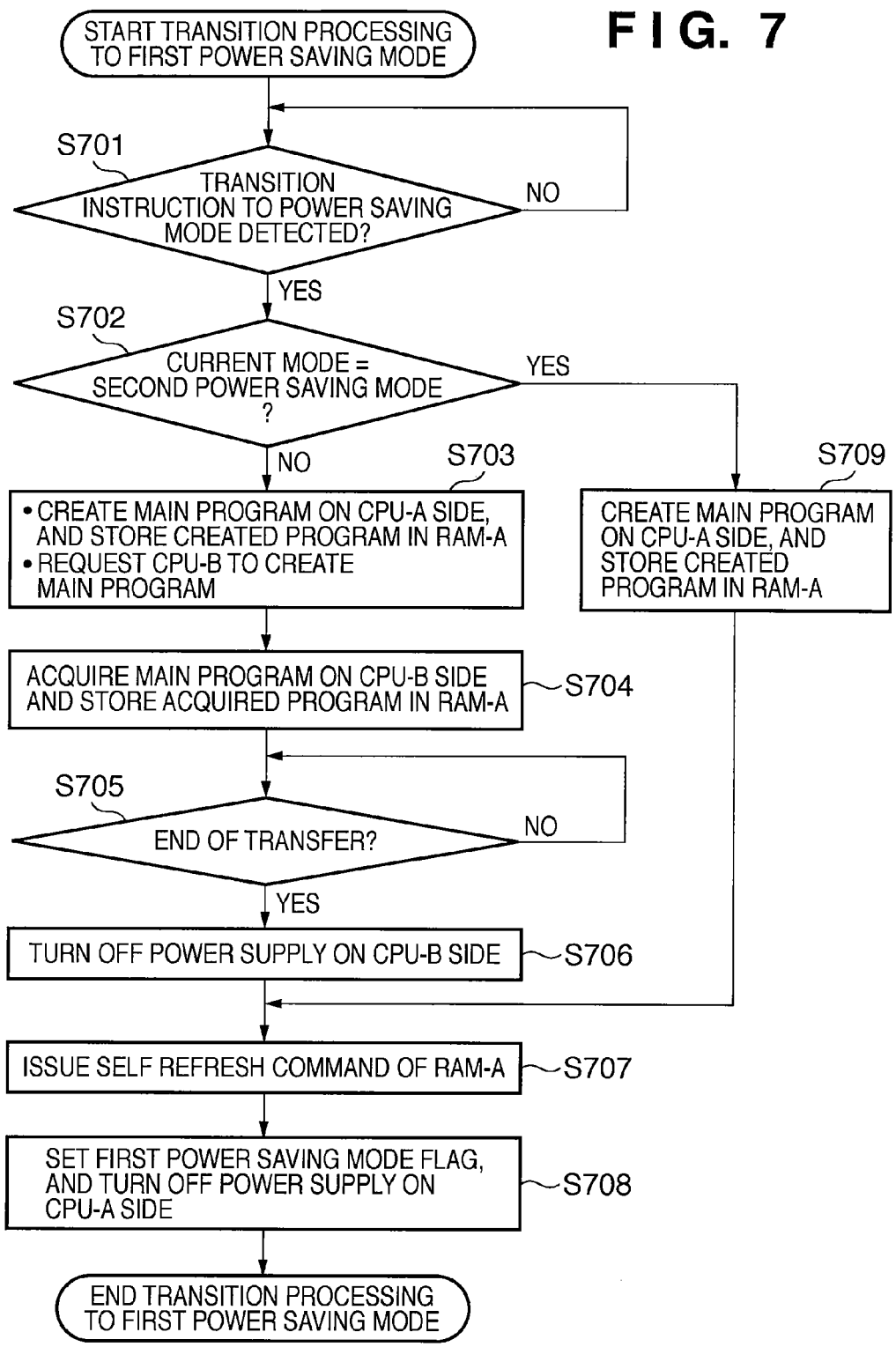

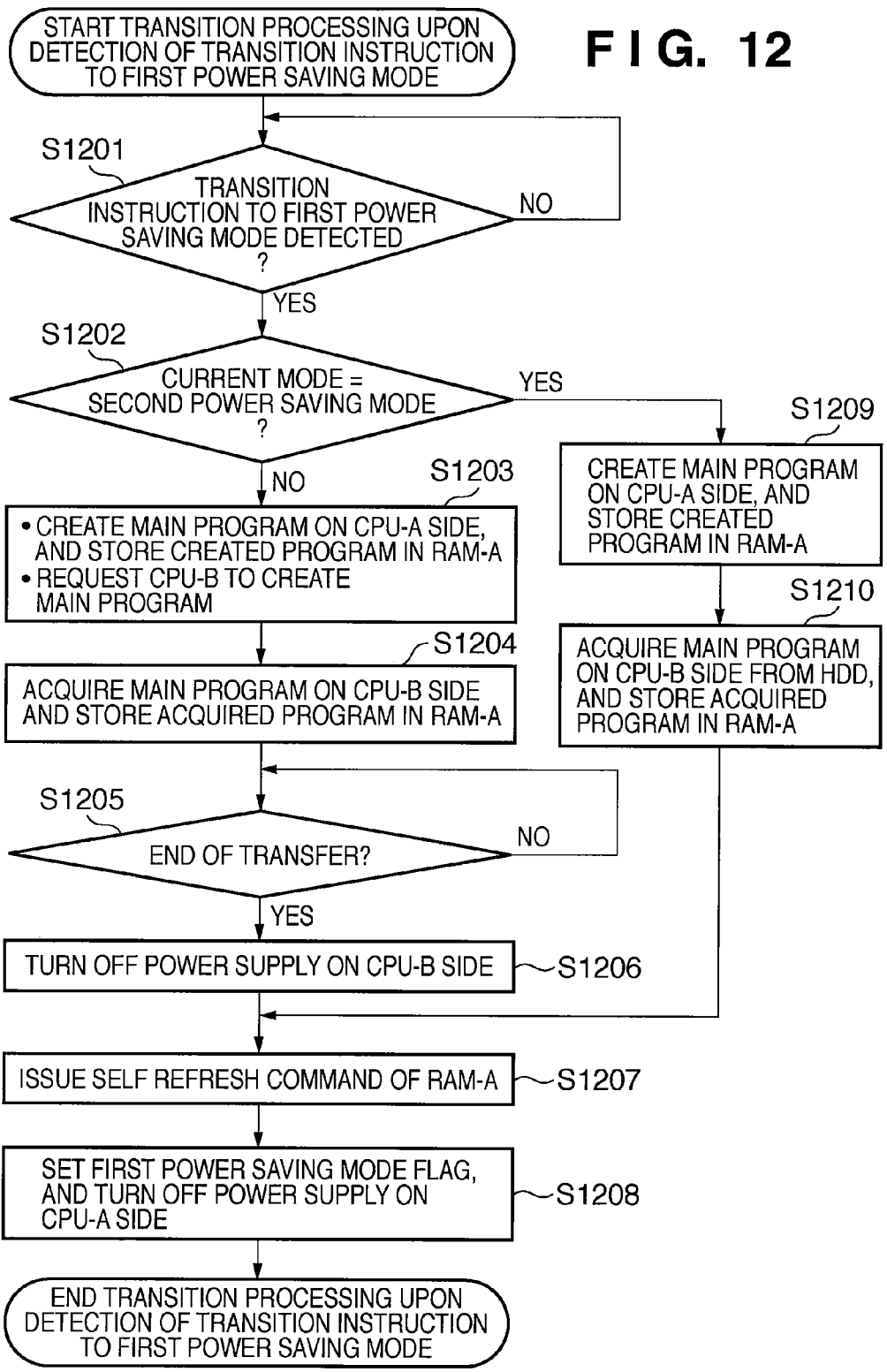
F I G. 12

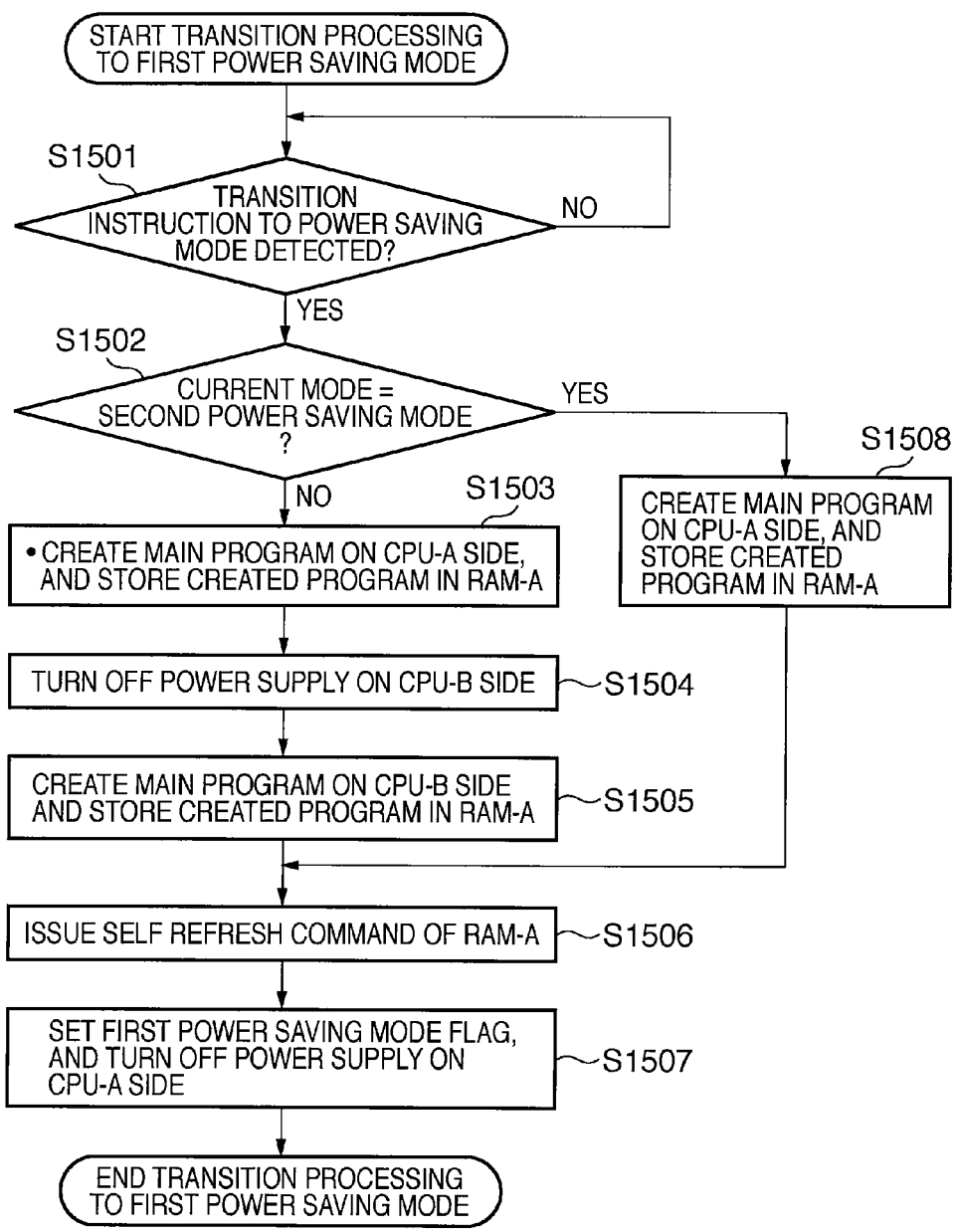

APPARATUS AND METHOD FOR SHORTENING THE TIME RETURNING FROM A POWER-SAVING MODE TO NORMAL POWER MODE AND REDUCING POWER CONSUMPTION IN THE POWER-SAVING MODE

This application claims the benefit of Japanese Application No. 2008-037950 filed on Feb. 19, 2008, and No. 2008-078277 filed on Mar. 25, 2008 which are hereby incorporated by reference herein in their entireties.

BACKGROUND OF THE INVENTION

1. Field of the Invention

The present invention relates to an information processing apparatus which incorporates a plurality of arithmetic units and a plurality of storage units, and an information processing method.

2. Description of the Related Art

In recent years, in order to implement multi-functional apparatuses, hardware components such as arithmetic devices (CPUs), main storage devices (e.g., RAMs), and auxiliary storage devices (HDDs) are incorporated in various apparatuses, and various functions are implemented by application programs.

Furthermore, a proposal that implements further multi-functions of an information processing apparatus by incorporating a plurality of arithmetic devices, and a plurality of OSs (operating systems) in one information processing apparatus has been made (for example, see Japanese Patent Laid-Open No. 2007-35066).

As the information processing apparatus has gained more multi-functions, power consumption in the information processing apparatus tends to increase. For this reason, it is required to reduce power consumption as much as possible not only in an operation mode in an active state of the information processing apparatus (non-power saving mode) but also in an operation mode in a sleep state of the apparatus (power saving mode).

On the other hand, in terms of improvement of usability, it is required to shorten an activation time from when electric power is supplied to the information processing apparatus until completion of activation, and to shorten a return time required until the apparatus returns from the power saving mode to a normal power mode.

To meet such conflicting needs, for example, Japanese Patent Laid-Open No. 2005-78197 and Japanese Patent Laid-Open No. 2007-25882 have proposed an arrangement in which electric power is supplied to only a main storage device upon transiting to the power saving mode, and main programs and required data are stored in the main storage device. With this arrangement, the return time can be shortened while reducing power consumption in the power saving mode.

Also, the following arrangement is known. That is, all data (hibernation image) on a main storage device is copied to, for example, a HDD using a given hibernation function, and the hibernation image of the main storage device is read out from the HDD when the apparatus resumes. In this case, the state of the main storage device immediately before the power supply is turned off can be restored. By applying this arrangement, power consumption in the power saving mode can be suppressed, and the return time can be shortened compared to a case in which an operating system and application software are launched from the beginning.

However, when a plurality of arithmetic devices and a plurality of main storage devices are incorporated in the information processing apparatus, the above arrangement cannot sufficiently reduce the power consumption and shorten the return time. For example, in the arrangement described in Japanese Patent Laid-Open No. 2005-78197 and Japanese Patent Laid-Open No. 2007-25882 above, in order to store main programs and required data in the power saving mode, electric power has to be supplied to the plurality of main storage devices, and power consumption in the power saving mode increases.

On the other hand, in case of the arrangement using the hibernation function, the power consumption can be suppressed, but data transfer from an auxiliary storage device to the plurality of main storage devices requires more time. Hence, shortening of the return time is limitated.

SUMMARY OF THE INVENTION

The present invention has been made in consideration of the aforementioned problems.

An information processing apparatus according to the present invention comprises the following arrangement. That is, an information processing apparatus having a normal power mode and a power saving mode, comprising: a first arithmetic unit configured to execute a first program loaded onto a first storage unit; a second arithmetic unit configured to execute a second program loaded onto a volatile second storage unit; a store control unit configured to store the second program in a storage unit which is not the second storage unit when a condition required to transit to the power saving mode is satisfied; and a power supply control unit configured to control the information processing apparatus to transit to the power saving mode by reducing power supply to the second storage unit when a condition required to transit to the power saving mode is satisfied, wherein when a condition required to return to the normal power mode is satisfied, the power supply control unit controls the information processing apparatus to transit to the normal power mode, the store control unit transfers the second program stored in the storage unit which is not the second storage unit to the second storage unit, and the second arithmetic unit executes the second program in response to completion of transfer of the second program to the second storage unit.

An information processing method according to the present invention comprises the following arrangement. That is, an information processing method in an information processing apparatus, which comprises: a first arithmetic unit configured to execute a first program loaded onto a first storage unit; and a second arithmetic unit configured to execute a second program loaded onto a volatile second storage unit, the method comprising: storing the second program to a storage unit which is not the second storage unit when a condition required to transit to a power saving mode is satisfied; controlling the information processing apparatus to transit to the power saving mode by reducing power supply to the second storage unit when a condition required to transit to the power saving mode is satisfied, controlling the information processing apparatus to transit to a normal power mode when a condition required to return to the normal power mode is satisfied; storing the second program stored in the storage unit which is not the second storage unit in the second storage unit in response to completion of transition of the information processing apparatus to the normal power mode in the controlling the information processing apparatus to transit to the normal power mode; and controlling the second arithmetic unit to execute the second program in response to completion of transfer of the second program to the second storage unit in the transferring the second program to the second storage unit.

According to the present invention, in an information processing apparatus which comprises a plurality of arithmetic units and a plurality of main storage units, power consumption in a power saving mode can be reduced, and a return time required to return from the power saving mode to a non-power saving mode can be shortened.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a view showing the arrangement of an operation unit of the image forming apparatus;

FIG. 5 is a view showing a mode transition state;

FIG. 7 is a flowchart showing the sequence of transition processing when the image forming apparatus transits to the first power saving mode;

FIG. 12 is a flowchart showing the sequence of transition processing in the image forming apparatus upon detection of a transition instruction to the first power saving mode;

FIG. 15 is a flowchart showing the sequence of transition processing when the image forming apparatus transits to the first power saving mode.

DESCRIPTION OF THE EMBODIMENTS

Preferred embodiments of the present invention will now be described in detail in accordance with the accompanying drawings.

[First Embodiment]

1. Arrangement of Image Forming Apparatus

Figure 1:
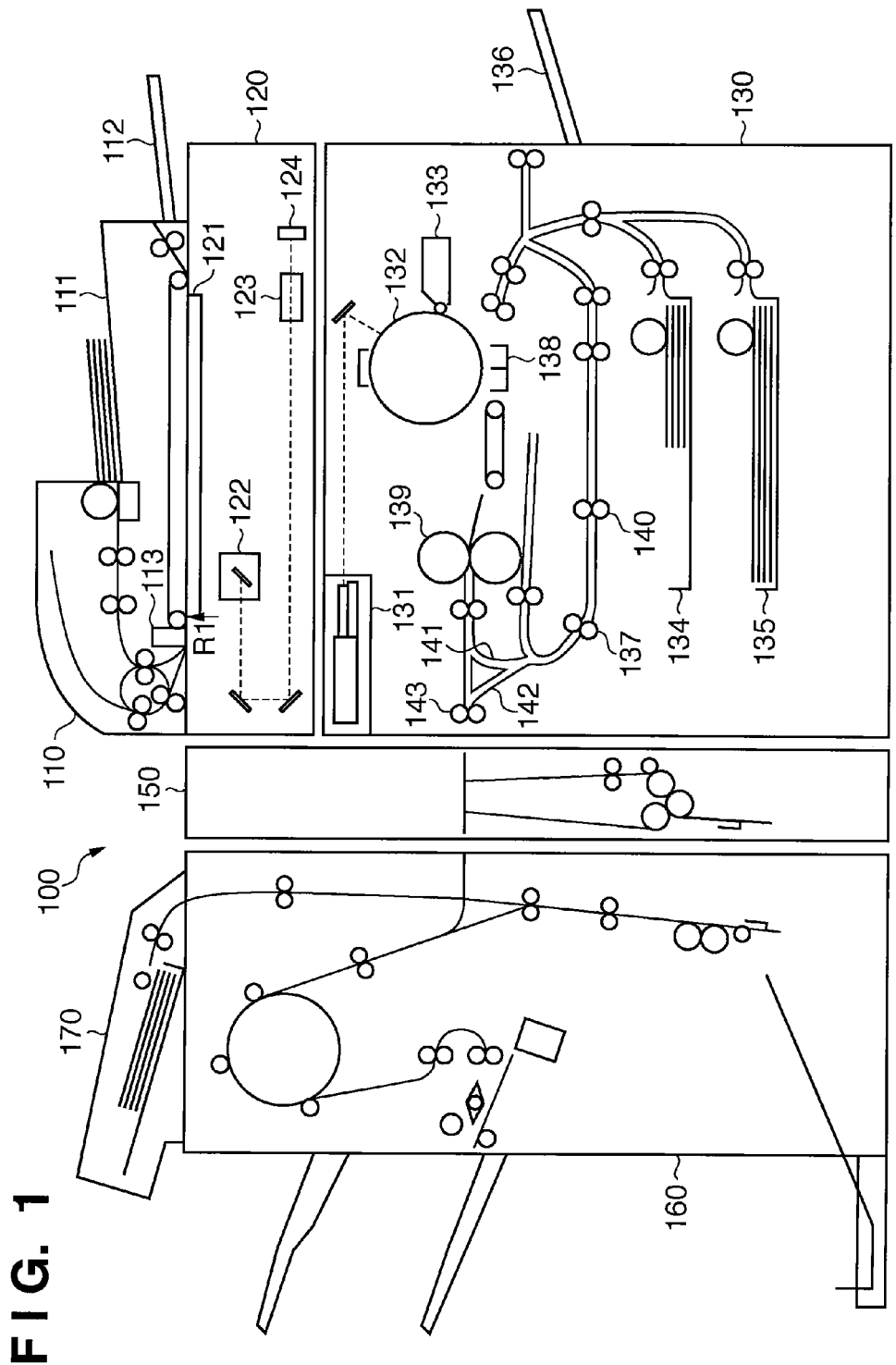
FIG. 1 is a sectional view showing the overall structure of an image forming apparatus, which incorporates an information processing apparatus according to one embodiment of the present invention.

FIG. 1 is a sectional view showing the overall structure of an image forming apparatus which incorporates an information processing apparatus according to this embodiment. An image forming apparatus 100 comprises a main body unit including a document feeder 110, image reader 120, and printer unit 130, a folding device 150, and finisher 160.

The document feeder 110 feeds documents set on a document tray 111 in turn from a top page one by one, and conveys it onto a platen glass 121 via a curved path.

As a method of reading a single-sided document by the image reader 120, a document fixed read mode and document passing read mode are known. In the document fixed read mode, a document is conveyed and stopped so that the trailing end of the document is located at a read position R1 on the platen glass 121, and a scanner unit 122 is moved from the left to the right, thus reading the document.

On the other hand, in the document passing read mode, a document is conveyed to the read position R1 at a certain read speed, and is read while the scanner unit 122 is kept fixed at the read position R1. In either mode, the read document is discharged onto a discharge tray 112.

Upon reading a double-sided document, an obverse face is read by the scanner unit 122, and a reverse face is read by an optical unit 113 arranged in the document feeder 110. In the optical unit 113, an image sensor, light source, and the like (not shown) are arranged.

Image data of a document generated by reading the document by an image sensor 124 via a lens 123 undergoes image processing in a controller control unit in a controller (not shown in FIG. 1). The image data that has undergone the image processing is stored in a hard disk in the controller, and is sent to an exposure control unit 131 via a printer control unit in the controller. The exposure control unit 131 outputs a laser beam according to the image data.

A photosensitive drum 132 is irradiated with the laser beam output from the exposure control unit 131, thus forming an electrostatic latent image on the photosensitive drum 132. The electrostatic latent image formed on the photosensitive drum 132 is developed by a developer 133 using a developing agent. The developing agent image on the photosensitive drum 132 is transferred onto a sheet fed from one of cassettes 134 and 135, manual feed unit 136, and double-sided convey path 137 via a transfer unit 138.

The sheet on which the developing agent image is transferred is guided to a fixing unit 139, and undergoes fixing processing of the developing agent. The sheet that has passed through the fixing unit 139 is temporarily guided from a path 141 to a path 140 by a flapper (not shown). When the trailing end of the sheet has left the path 141, that sheet is switched back, and is guided from a path 142 to discharge rollers 143.

In this way, the sheet can be discharged by the discharge rollers 143 from the printer unit 130 with the face, on which the developing agent image is transferred, facing down (face down). This is called reverse discharge. By discharging sheets in this way, image data of a plurality of documents read using the document feeder 110 can be printed in a correct page order from the first page.

Note that upon making image formation on a hard sheet like an OHP sheet inserted from the manual feed unit 136, the sheet is discharged by the discharge rollers 143 with the face on which the developing agent image is transferred facing up (face up) without being guided to the path 141.

Upon making image formation on two faces of a sheet, the sheet is guided from the fixing unit 139 to the paths 141 and 140. Immediately after the trailing end of the sheet has left the path 141, the sheet is switched back, and is guided to the double-sided convey path 137 by a flapper (not shown). An electrostatic latent image is transferred again onto the sheet guided to the double-sided convey path 137 by the transfer unit 138, and that sheet undergoes fixing processing by the fixing unit 139.

In this way, in a loop of the paths, which start from the transfer unit 138 and return again to it via the double-sided convey path 137, the path length, roller layout, and driving system are divided so that five half-size sheets such as A4 and B5 can be concurrently conveyed.

Note that as the discharge page order by these processes, since odd pages are discharged facing down, the page order in a double-sided copy mode can be adjusted.

The sheet discharged from the discharge rollers 143 is fed into the folding device 150. The folding device 150 executes processing for Z-folding the sheet. An A3- or B4-sized sheet is fed into the finisher 160 after it undergoes the folding processing in the folding device 150. Sheets of other sizes are directly fed into the finisher 160.

The finisher 160 executes processing such as bookbinding, stitching, or punching. An inserter 170 is arranged on the top portion of the finisher 160, and feeds a cover sheet, insert sheet, and the like to the finisher 160.

2. Arrangement of Controller Incorporated in Image Forming Apparatus 100

Figure 2:
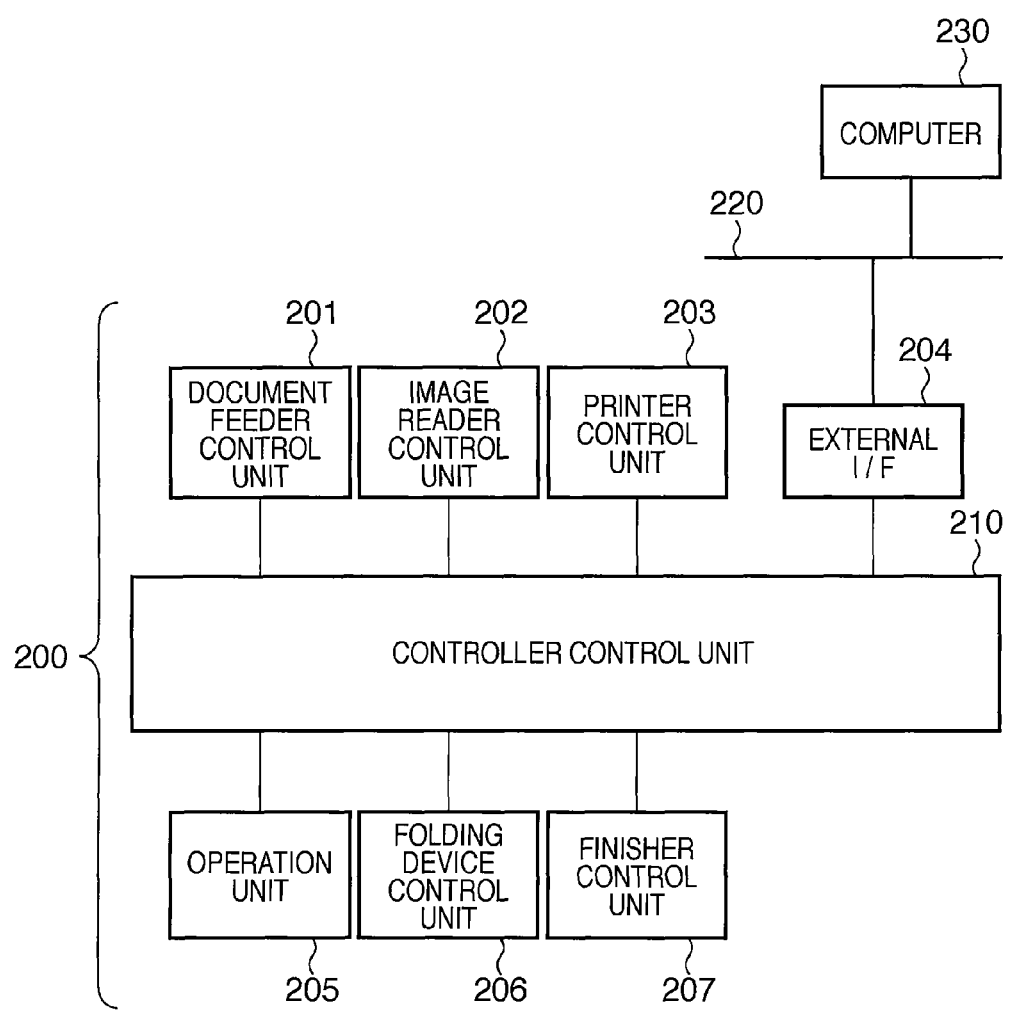
FIG. 2 is a block diagram showing the overall arrangement of a controller incorporated in the image forming apparatus, and an external computer connected via an external bus.

FIG. 2 is a block diagram showing the overall arrangement of a controller 200 incorporated in the image forming apparatus 100, and an external computer 230 connected to the controller via an external bus 220. The controller 200 mainly includes a controller control unit 210 which controls the overall image forming apparatus 100.

A document feeder control unit 201 controls the document feeder 110 based on settings using an operation unit 205 and an instruction from the external computer 230. An image reader control unit 202 controls the image reader 120. The controller control unit 210 acquires image data of a document by communicating with the document feeder control unit 201 and image reader control unit 202.

A printer control unit 203 controls the printer unit 130. The controller control unit 210 prints image data on a sheet by communicating with the printer control unit 203. A folding device control unit 206 and finisher control unit 207 respectively control the folding device 150 and finisher 160. The controller control unit 210 implements processing such as stapling or punching on printed sheets by communicating with the folding device control unit 206 and finisher control unit 207.

An external I/F 204 is an interface which connects the external computer 230. For example, the external I/F 204 receives print data from the external computer 230 via the external bus 220 such as a network or USB, and rasterizes the print data to output image data. Also, the external I/F 204 transmits image data stored in a hard disk (HDD) in the controller control unit 210 to the external computer 230 via the external bus 220.

3. Arrangement of Controller Control Unit 210

Figure 3:
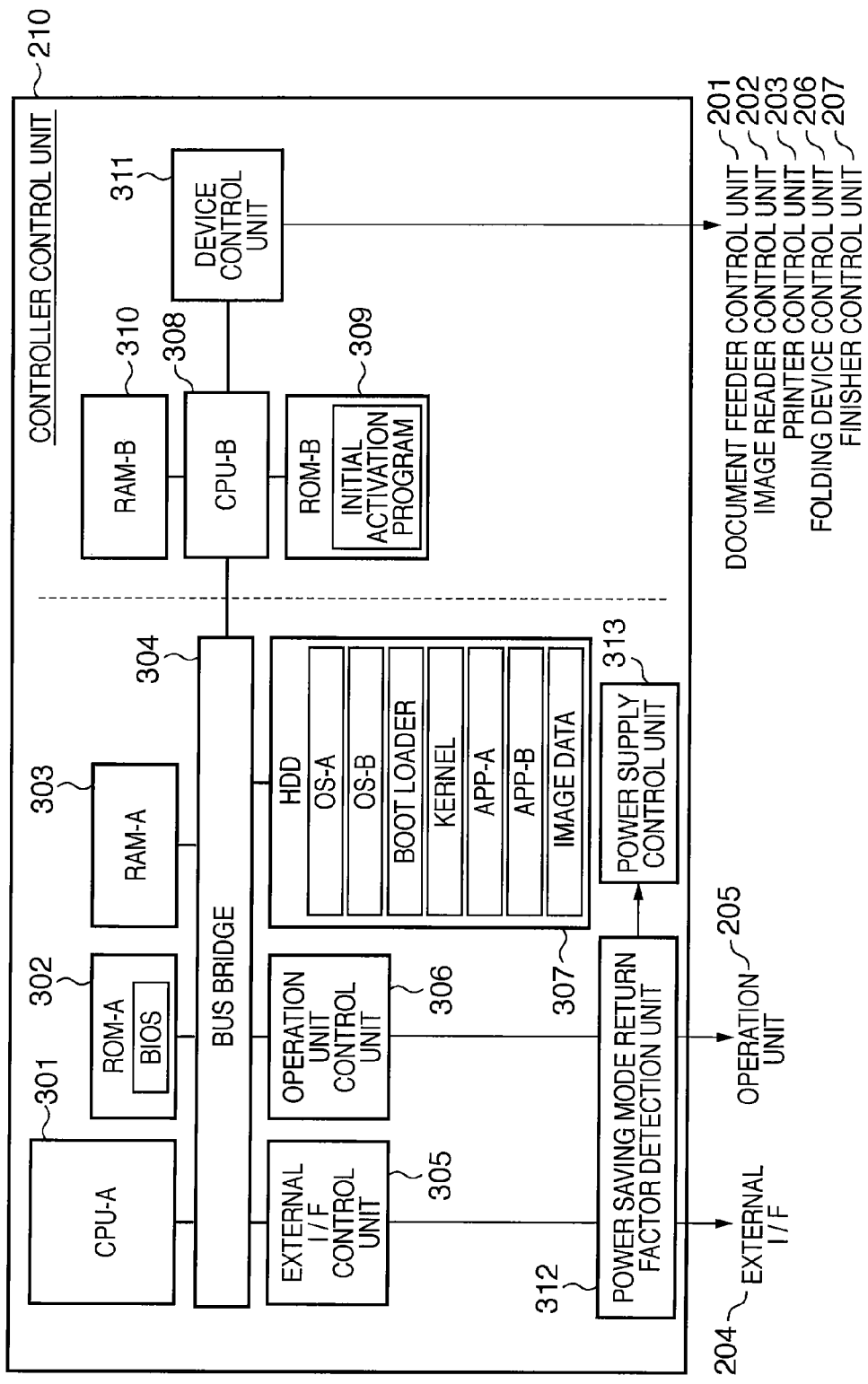
FIG. 3 is a block diagram showing the device arrangement of a controller control unit as an information processing apparatus according to the embodiment of the present invention.

FIG. 3 is a block diagram showing the device arrangement of the controller control unit 210 as an information processing apparatus according to this embodiment.

The controller control unit 210 comprises two CPUs (first and second arithmetic units), that is, a CPU-A 301 and CPU-B 308. These CPUs respectively execute independent operating systems (to be abbreviated as OSs hereinafter) and application programs, thereby controlling respective devices to be controlled.

Note that the CPU-A 301 and CPU-B 308 respectively function as arithmetic units. Each arithmetic unit may be configured by a single CPU like the CPU-A 301 or CPU-B 308, or may be configured by a plurality of CPUs. Alternatively, each arithmetic unit may be configured by a single CPU having a plurality of CPU cores.

On the CPU-A 301 side, a bus bridge 304 is connected, and the CPU-A 301 and CPU-B 308 communicate with each other via the bus bridge 304. To the bus bridge 304, a ROM-A 302 that stores an initial activation BIOS program (to be simply referred to as a BIOS hereinafter) of the CPU-A 301 is connected. Furthermore, a RAM-A 303 (first main storage unit) on which programs to be executed by the CPU-A 301 are temporarily loaded and which is used as a work area upon execution is connected.

A hard disk (HDD) 307 is a nonvolatile program storage unit, and includes first and second program storage units, which respectively store two OSs (OS-A and OS-B) of the CPU-A 301 and CPU-B 308. Also, the first and second program storage units respectively store a boot loader and kernel which specify the operation of the CPU-A 301 at the time of activation, and application programs (APP-A and APP-B). Also, the HDD 307 stores acquired image data, and the like. Assume that the controller control unit 210 of this embodiment is configured to allow both the CPU-A 301 and CPU-B 308 to access the HDD 307.

Note that the APP-A is a program which runs under the management of the OS-A when the CPU-A 301 executes the OS-A. Also, the APP-B is a program which runs under the management of the OS-B when the CPU-B 308 executes the OS-B. The OS-A and APP-A serve as a first program to be executed by the CPU-A, and the OS-B and APP-B serve as a second program to be executed by the CPU-B.

Note that the access speeds of the CPU-A 301 and CPU-B 308 to the RAM-A 303 and a RAM-B 310 are higher than those to the HDD 307. The reason why the access speed to the HDD is low is to require a time for increasing the rotational speed of (for spinning up) a platter (a metal disk applied with a magnetic member) that forms the HDD and a time for moving (seeking) a head.

To the bus bridge 304, an external I/F control unit 305 that controls the external I/F 204 and an operation unit control unit 306 that controls the control unit 205 are further connected.

To the external I/F control unit 305 and operation unit control unit 306, a power saving mode return factor detection unit 312 is connected. When the image forming apparatus 100 is in a power saving mode, the power saving mode return factor detection unit 312 detects pressing of a main switch key on the operation unit 205 or entry of a print job from the external I/F 204, and informs a power supply control unit 313 of that detection.

The power supply control unit 313 controls the power supply of the overall image forming apparatus 100. More specifically, the power supply control unit 313 executes control as to whether or not to supply electric power to respective devices, that is, the document feeder control unit 201, image reader control unit 202, printer control unit 203, folding device control unit 206, and finisher control unit 207. Also, the power supply control unit 313 executes control as to whether or not to supply electric power to respective devices of the controller control unit 210 depending on a normal power mode and two power saving modes (first and second power saving modes (to be described in detail later)) of the controller control unit 210. Note that the power supply control unit 313 can control whether or not to supply electric power to the HDD 307.

On the other hand, on the CPU-B 308 side, a ROM-B 309 that stores an initial activation program of the CPU-B 308 is connected. Also, the RAM-B 310 (volatile second storage unit) on which programs to be executed by the CPU-B 308 are temporarily loaded, and which is used as a work area upon execution is connected.

Furthermore, a device control unit 311 is connected to the CPU-B 308. The device control unit 311 is connected to the document feeder control unit 201, image reader control unit 202, printer control unit 203, folding device control unit 206, and finisher control unit 207, and controls these control units.

4. Arrangement of Operation Unit 205

FIG. 4 is a view showing the arrangement of the outer appearance of the operation unit 205 of the image forming apparatus 100. An LCD display unit 410 is prepared by adhering a touch panel sheet on an LCD, and displays an operation screen of the image forming apparatus 100. When one of keys displayed on the LCD display unit 410 is pressed, the LCD display unit 410 transmits the position information of that key to the controller control unit 210. A numeric keypad 401 is used when the user inputs a numeric value such as a copy count.

A start key 402 is used when the user starts a copying operation or document read operation after he or she sets a desired condition. A stop key 403 is used when the user wants to stop an active operation. A power saving key 404 is used when the user sets or resets a power saving mode.

Reference numeral 405 denotes a guide key pressed when the user cannot understand a function of an arbitrary key. Upon pressing the guide key 405, the LCD display unit 410 displays an explanation of that key. Reference numeral 406 denotes a copy mode key, which is used to copy a document.

Reference numeral 407 denotes a FAX key, which is used to make settings about FAX. Reference numeral 408 denotes a file key, which is used when the user wants to output file data. Reference numeral 409 denotes a printer key, which is used to input setting information upon execution of print processing from, for example, the external computer 230.

5. Sequence of Processing upon Activating Image Forming Apparatus 100

Figure 13:
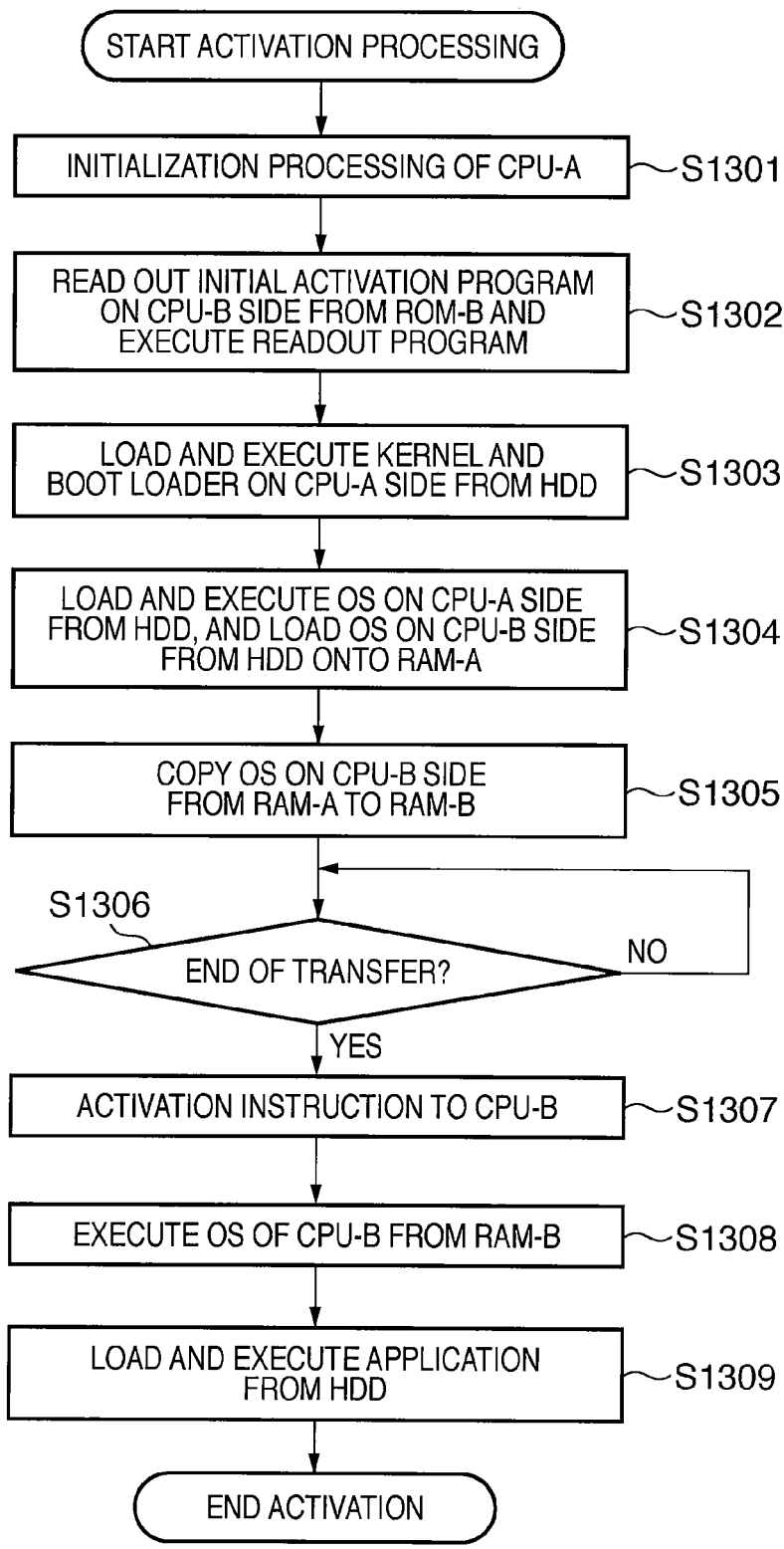
FIG. 13 is a flowchart showing the sequence of processing upon activating the image forming apparatus.
Figure 14:
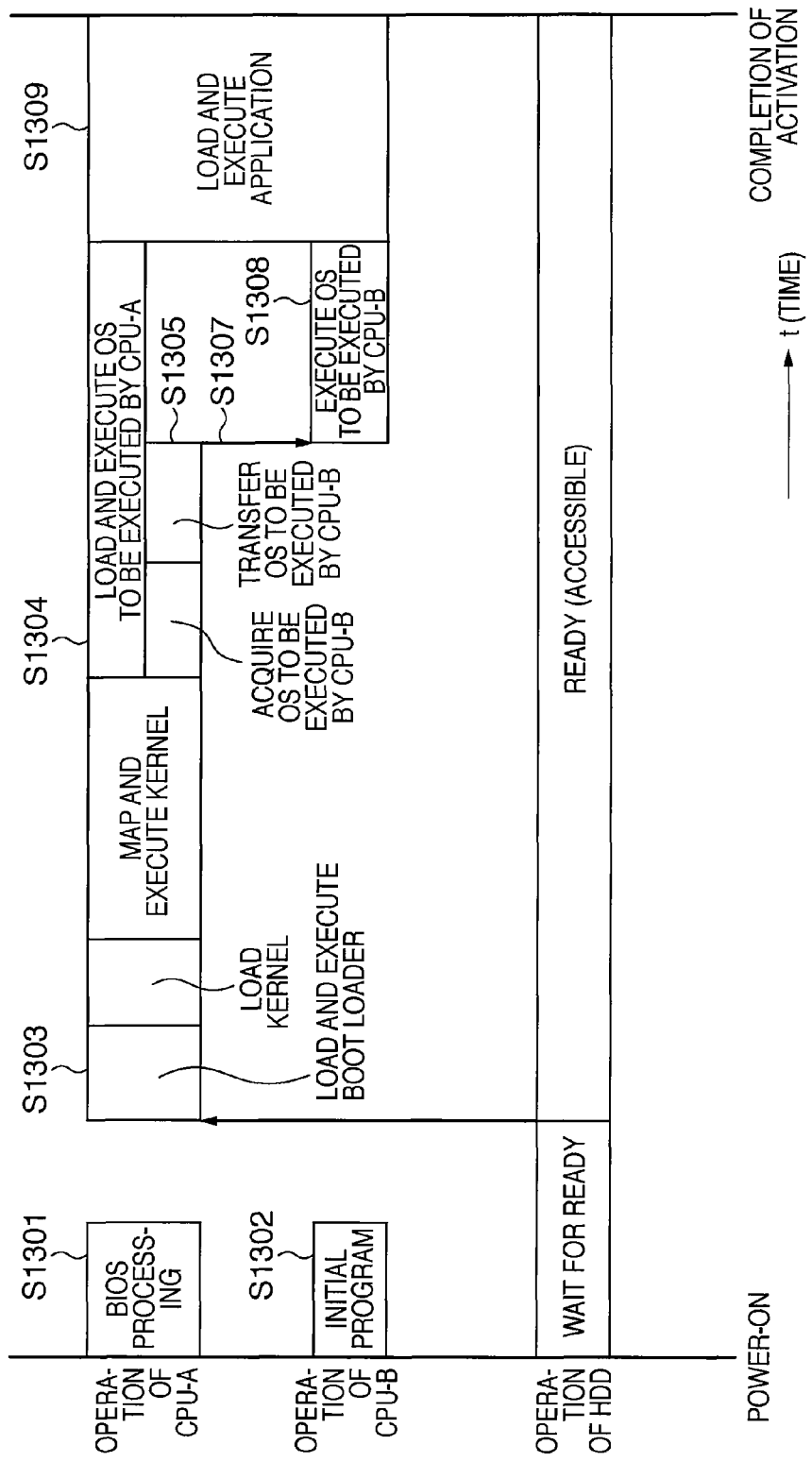
FIG. 14 is a chart showing the processing contents of a CPU-A, CPU-B, and HDD, which operate based on the flowchart shown in FIG. 13, along with an elapse of time.

FIG. 13 is a flowchart showing the sequence of processing of the controller control unit 210 upon activating the image forming apparatus 100. FIG. 14 is a chart showing the processing contents of the CPU-A 301, CPU-B 308, and HDD 307, which operate based on the flowchart shown in FIG. 13, along with an elapse of time. The sequence of processing of the controller control unit 210 upon activating the image forming apparatus 100 will be described below with reference to FIGS. 13 and 14. Assume that in this embodiment, the CPU-A 301 operates based on Linux as a general-purpose OS.

When the respective units in the controller control unit 210 are powered by pressing a main switch (not shown) of the image forming apparatus 100 by the user, activation processing starts.

In step S1301, the CPU-A 301 loads the BIOS from the ROM-A 302 onto the RAM-A 303 to execute initialization and the like of the CPU-A 301.

In step S1302, the CPU-B 308 reads out and executes the initial activation program from the ROM-B 309 to execute initialization and the like of the RAM-B 310 and CPU-B 308.

In step S1303, after the CPU-A 301 confirms that the HDD 307 becomes a readable/writable state (Ready state) as a result of execution of the BIOS, it loads the boot loader from the HDD 307 onto the RAM-A 303 and launches the boot loader.

Furthermore, as a result of execution of the boot loader, the CPU-A 301 accesses the HDD 307 to acquire the kernel and initial RAM DISK data (initrd), and loads the kernel and initrd onto the RAM-A 303. The kernel and initrd loaded onto the RAM-A 303 are mapped on the RAM-A 303, and the CPU-A 301 executes the kernel based on the initrd. As a result of execution of the kernel, the CPU-A 301 recognizes various devices in the controller control unit 210 and makes settings of various devices. After that, the process advances to step S1304.

In step S1304, the CPU-A 301 loads an OS (OS-A) to be executed from the HDD 307 onto the RAM-A 303 and begins to execute the OS. At the same time, the CPU-A 301 loads the OS (OS-B), which is stored in the HDD 307 and is to be executed by the CPU-B 308, onto the RAM-A 303.

In this way, in the controller control unit 210, the CPU-A 301 collectively loads both the OSs onto the RAM-A 303.

As a result, unlike the conventional method in which the CPU-A 301 and CPU-B 308 independently access the HDD 307, the CPU-A 301 can occupy access to the HDD 307. Hence, the time required to load both the OSs can be shortened.

In step S1305, the CPU-A 301 transfers the OS (OS-B) to be executed by the CPU-B 308 from the RAM-A 303 to the RAM-B 310. In this case, the CPU-A 301 serves as a transfer unit for controlling transfer of the OS-B.

The CPU-A 301 monitors in step S1306 if transfer of the OS (OS-B) to be executed by the CPU-B 308 from the RAM-A 303 to the RAM-B 310 is complete. If the CPU-A 301 determines that transfer is complete, it notifies the CPU-B 308 of the end of transfer and start of activation in step S1307.

Upon reception of this notification, the CPU-B 308 executes the OS (OS-B) on the RAM-B 310 in step S1308.

In step S1309, the CPU-A 301 loads and executes an application program (APP-A) in the HDD 307. Also, the CPU-B 308 loads and executes an application program (APP-B) in the HDD 307. As a result, the information processing apparatus completes activation, and enters an operation standby state.

6. Explanation about First and Second Power Saving Modes

The power saving modes of the image forming apparatus 100 will be described below. The image forming apparatus 100 according to this embodiment has a normal power mode and two power saving modes (first and second power saving modes) in association with power supply control.

Transition states of respective modes will be described first using FIG. 5. Upon detection of a user instruction or when a predetermined condition is met, the image forming apparatus 100 of this embodiment transits to a power saving mode (power saving mode transition unit). More specifically, the apparatus transits from the normal power mode to the second power saving mode or from the second power saving mode to the first power saving mode or from the normal power mode to the first power saving mode via the second power saving mode.

Likewise, upon detection of a user instruction or when a predetermined condition is met, the image forming apparatus 100 of this embodiment returns to the normal power mode. More specifically, the apparatus returns from the second power saving mode to the normal power mode or from the first power saving mode to the normal power mode via the second power saving mode (normal power mode transition unit).

The power supply states in the respective power saving modes of the image forming apparatus 100 will be described below using FIGS. 6A and 6B.

Figure 6A:
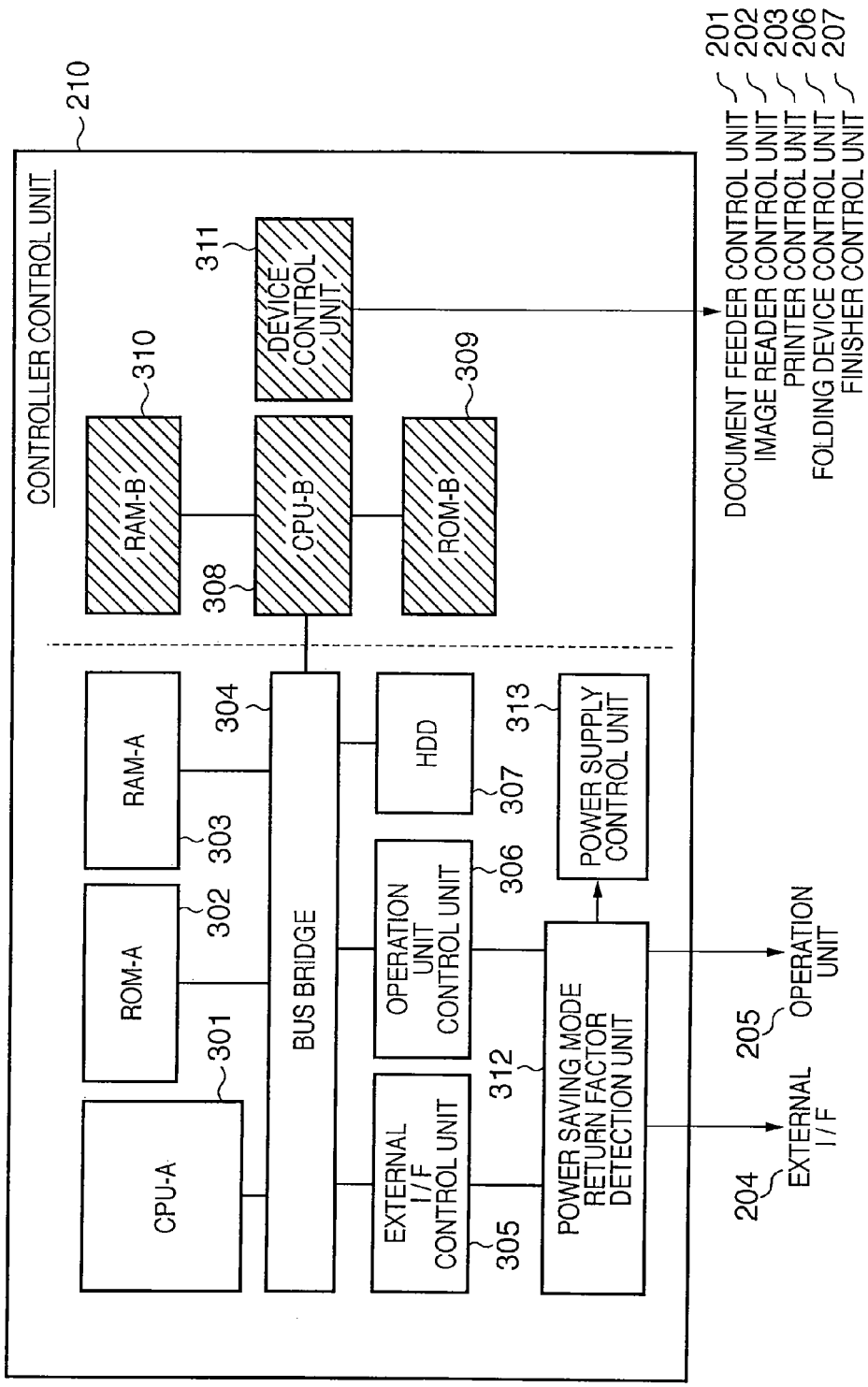
FIGS. 6A and 6B are block diagrams showing power supply states of electric power to respective devices which configure a controller control unit 210 upon transiting to a first power saving mode and second power saving mode.

FIG. 6A shows the power supply state to respective devices which configure the controller control unit 210 upon transiting to the second power saving mode (to indicate that no electric power or reduced electric power is supplied to hatched devices).

As shown in FIG. 6A, in the second power saving mode, electric power is supplied to only devices on the CPU-A 301 side. On the other hand, no electric power is supplied to the document feeder control unit 201, image reader control unit 202, printer control unit 203, folding device control unit 206, and finisher control unit 207. The power supply to the HDD 307 can be turned on or off from the power supply control unit 313 as the situation demands.

Figure 6B:
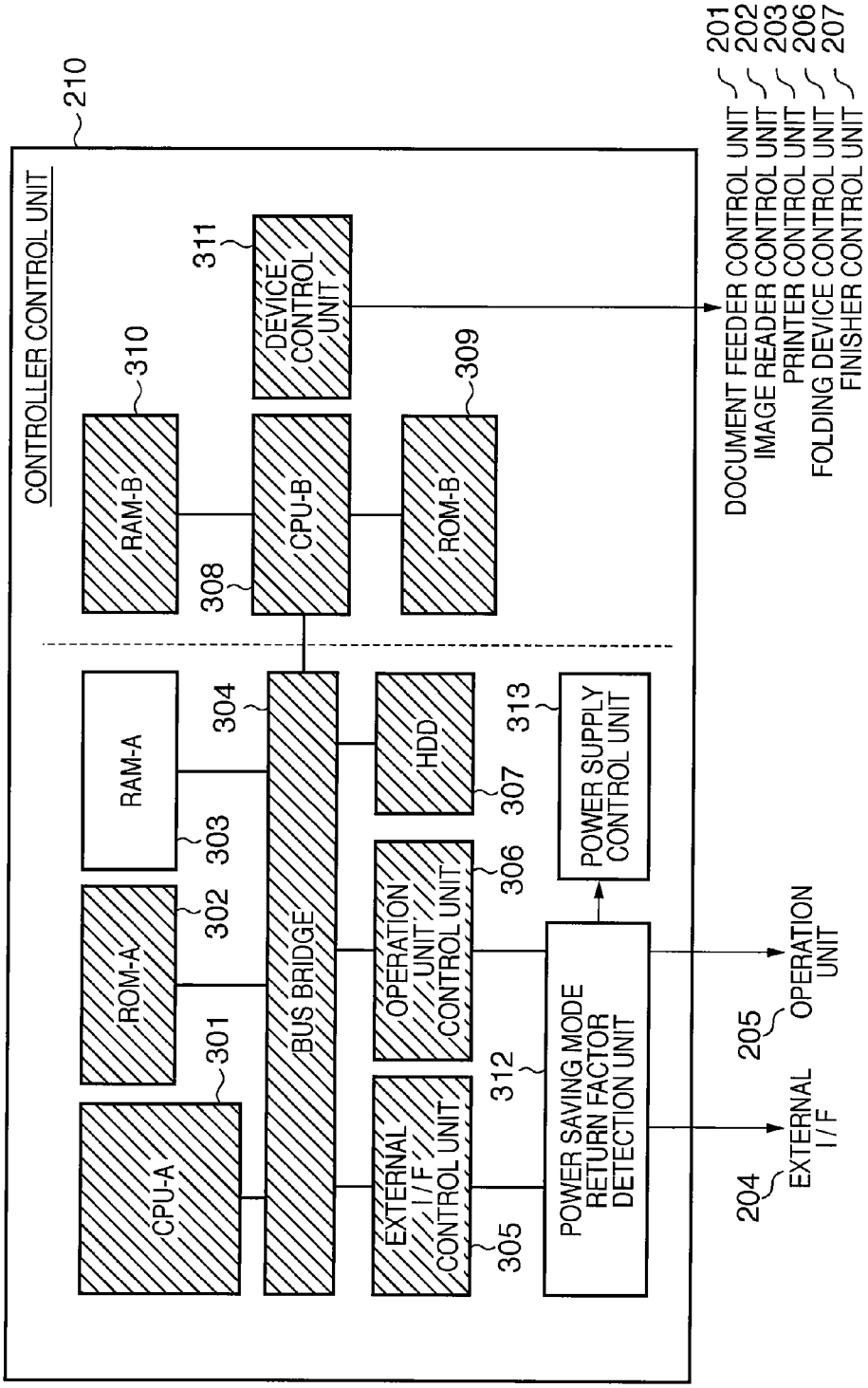

FIG. 6B shows the power supply state to respective devices which configure the controller control unit 210 upon transiting to the first power saving mode (to indicate that no electric power or reduced electric power is supplied to hatched devices). Note that in the first power saving mode, the image forming apparatus 100 does not most require electric power.

As shown in FIG. 6B, in the first power saving mode, electric power is supplied to only the RAM-A 303, power saving mode return factor detection unit 312, and power supply control unit 313. On the other hand, no electric power is supplied to the document feeder control unit 201, image reader control unit 202, printer control unit 203, folding device control unit 206, and finisher control unit 207.

Note that in the first power saving mode, electric power is supplied to only the component 303 of the components 301 to 307. Alternatively, electric power may be supplied to one or more components of the components 301 to 307 except for the component 303.

The sequences of transition processing to the power saving mode and return processing from the power saving mode in the image forming apparatus 100 according to this embodiment will be described in detail below.

7. Sequence of Transition Processing upon Transiting to First Power Saving Mode

FIG. 7 is a flowchart showing the sequence of transition processing when the image forming apparatus 100 transits to the first power saving mode.

It is checked in step S701 if a condition required to transit to the power saving mode is satisfied. If it is determined that the condition is satisfied, the process advances to step S702.

More specifically, if the user presses the power saving key 404 in the operation unit 205, that instruction is accepted, and it is determined that a transition instruction to the power saving mode is detected. The process then advances to step S702. Alternatively, if the image forming apparatus 100 is not in use for a predetermined time period, it is determined that a transition instruction to the power saving mode is detected, and the process advances to step S702.

The CPU-A 301 checks in step S702 if the current mode of the image forming apparatus 100 is the second power saving mode. If it is determined in step S702 that the current mode of the image forming apparatus 100 is not the second power saving mode but the normal power mode, the process advances to step S703.

In step S703, the CPU-A 301 creates a main program which runs on the self OS, and stores it in the RAM-A 303. Also, the CPU-A 301 requests the CPU-B 308 to create a main program on the CPU-B 308 side.

Note that the main program created by the CPU-A 301 includes at least the OS-A and APP-A. The main program created by the CPU-A 301 may include information indicating statuses immediately before the image forming apparatus 100 transits from the normal power mode to the power saving mode. The main program to be created by the CPU-B 308 includes at least the OS-B and APP-B. The main program created by the CPU-B 308 may include information indicating statuses immediately before the image forming apparatus 100 transits from the normal power mode to the power saving mode. Each CPU (CPU-A and CPU-B) creates, as the main program, information associated with its status, those of connected devices, and work states of the OS and application. The created main program is required upon returning from the power saving mode. Note that if the RAM-A 303 has a sufficiently large capacity, all data of the RAM-A 303 may be held. In this case, all the data of the RAM-A 303 become the main program. When all the data of the RAM-A 303 are used as the main program, that main program is called a hibernation image.

In step S704, the CPU-A 301 transfers the main program and data created on the RAM-B 310, and stores them in the RAM-A 303 to which power supply is maintained. Namely, the CPU-A 301 transfers the main program and data from RAM-B 310 to the RAM-A 303. The CPU-A 301 checks in step S705 if storage of the main program created on the CPU-B 308 side in the RAM-A 303 is complete. If it is determined that storage in the RAM-A 303 is complete, the process advances to step S706.

In step S706, the CPU-A 301 turns off the power supply on the CPU-B 308 side via the power supply control unit 313. Also, the CPU-A 301 turns off the power supply to the document feeder control unit 201, image reader control unit 202, printer control unit 203, folding device control unit 206, and finisher control unit 207. As a result, the power supply state becomes that shown in FIG. 6A, and the apparatus transits to the second power saving mode.

In step S707, the CPU-A 301 issues a self refresh command to the RAM-A 303 to hold the main programs and data of both the CPU-A 301 and CPU-B 308 held in the RAM-A 303.

In step S708, the CPU-A 301 sets a first power saving mode flag in the power saving mode return factor detection unit 312, and turns off the power supply on the CPU-A 301 side via the power supply control unit 313, thus transiting to the first power saving mode.

On the other hand, if it is determined in step S702 that the current mode of the image forming apparatus 100 is the second power saving mode, the process advances to step S709. In step S709, since the main program on the CPU-B 308 side has already been stored in the RAM-A 303, the CPU-A 301 creates a main program which runs on the self OS, and stores it in the RAM-A 303 to which power supply is maintained. After that, the process advances to step S707 to issue a self refresh command to the RAM-A 303, thereby holding the main programs and data of both the CPU-A 301 and CPU-B 308 held in the RAM-A 303.

8. Sequence of Return Processing upon Returning to Normal Power Mode

Figure 8:
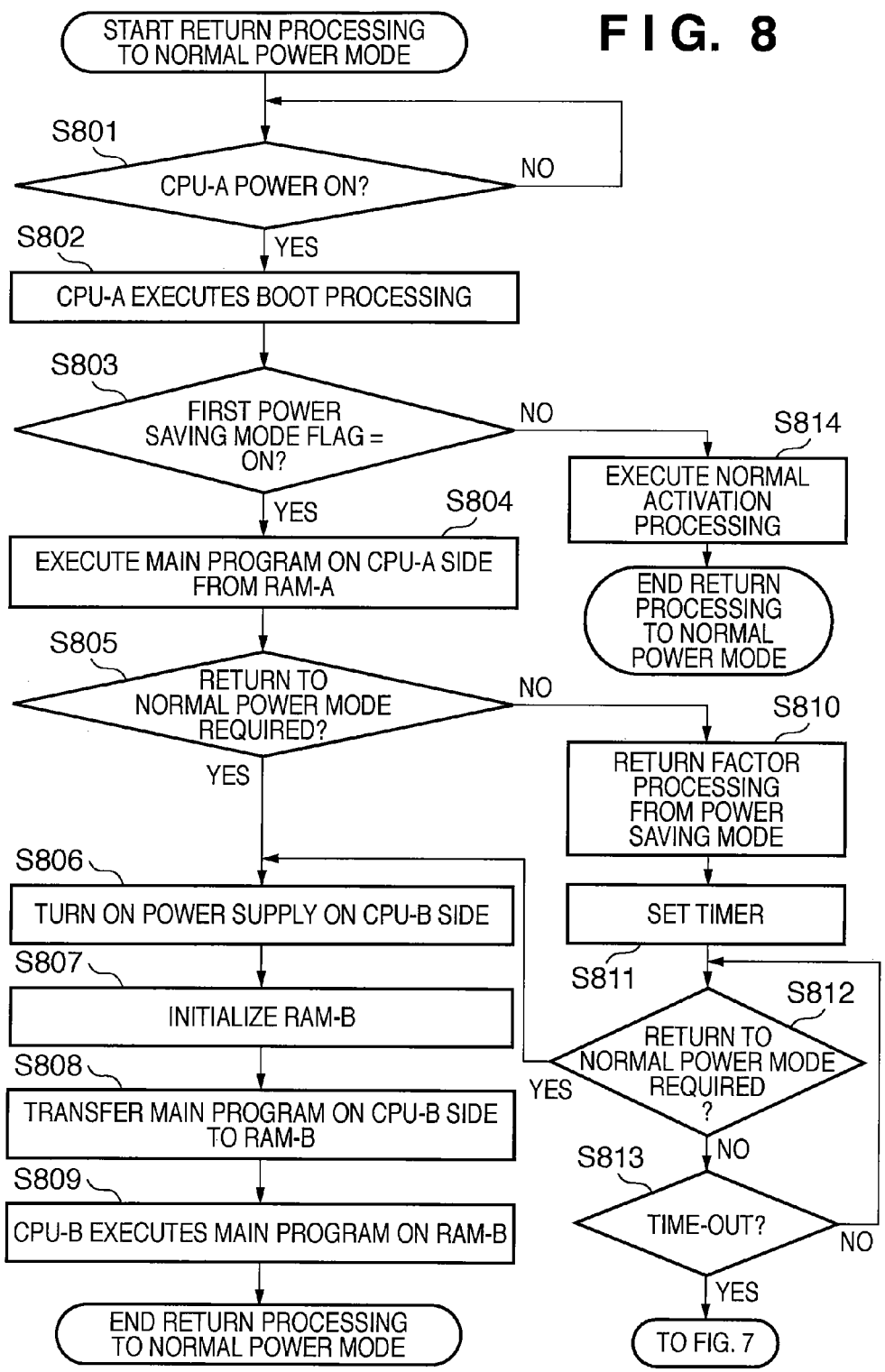
FIG. 8 is a flowchart showing the sequence of return processing when the image forming apparatus returns from the first power saving mode.

FIG. 8 is a flowchart showing the sequence of return processing when the image forming apparatus 100 returns to the normal power mode.

A case in which the image forming apparatus 100 returns to the normal power mode is roughly classified into the following three cases.

A case in which the main switch is pressed while the AC power supply of the image forming apparatus 100 is OFF, the image forming apparatus 100 is activated since the AC power supply is turned on, and the apparatus 100 returns to the normal power mode.

A case in which when the image forming apparatus 100 is in the first power saving mode, the power saving key 404 is pressed, and the image forming apparatus 100 returns to the normal power mode via the second power saving mode.

A case in which when the image forming apparatus 100 is in the first power saving mode, it returns to the second power saving mode in response to an image data acquisition request from the external computer 230, and then returns to the normal power mode in response to input of another job.

The sequence of the return processing to the normal power mode will be described below using the flowchart that considers the aforementioned three cases.

When the user presses the main switch or the power saving key 404 in the operation unit 205, or when the external computer 230 issues an image data acquisition request, the process in step S801 is executed. More specifically, the power saving mode return factor detection unit 312 supplies electric power to the CPU-A 301 via the power supply control unit 313.

In step S802, the CPU-A 301 launches the BIOS from the ROM-A 302 to execute boot processing.

The CPU-A 301 checks in step S803 if the first power saving mode flag in the power saving mode return factor detection unit 312 is ON. If it is determined that the first power saving mode flag is ON, the CPU-A 301 determines return from the first power saving mode, and the process advances to step S804.

On the other hand, if it is determined in step S803 that the first power saving mode flag is OFF, the CPU-A 301 determines return from the state in which the AC power supply is OFF, and executes normal activation processing for activating the image forming apparatus 100 using programs in the HDD 307 in step S814.

If the CPU-A 301 determines return from the first power saving mode in step S803, the process advances to step S804.

In step S804, the CPU-A 301 executes the self main program held in the RAM-A 303, thus activating respective devices on the CPU-A 301 side. As a result, the power supply state changes to that shown in FIG. 6A, and the image forming apparatus 100 returns to the second power saving mode.

In step S805, the CPU-A 301 checks a return factor based on the detection result of the power saving mode return factor detection unit 312, and determines the mode to which the image forming apparatus 100 is to return based on the checking result.

More specifically, when the return processing starts in response to pressing of the power saving key 404 in the operation unit 205 by the user, it is determined that the operation of the image forming apparatus such as the copy operation is required, and the overall image forming apparatus is required to return to the normal power mode. On the other hand, when the return processing starts in response to an acquisition request transmitted from the external computer 230 via the network so as to acquire image data saved in the RAM-A 303 or HDD 307, only the CPU-A 301 side is resumed. That is, the image forming apparatus is controlled to return to the second power saving mode.

For this reason, when the return processing starts upon pressing of the power saving key 404 in the operation unit 205 by the user, it is determined in step S805 that the image processing apparatus is required to return to the normal power mode, and the process advances to step S806.

In step S806, the CPU-A 301 turns on the power supply to respective devices on the CPU-B 308 and the HDD 307 via the power supply control unit 313 (to resume the power supply). Also, the CPU-A 301 turns on the power supply to the document feeder control unit 201, image reader control unit 202, printer control unit 203, folding device control unit 206, and finisher control unit 207.

In step S807, the CPU-B 308 launches the initial activation program in the ROM-B 309, thereby initializing the RAM-B 310.

In step S808, the CPU-A 301 transfers the main program on the CPU-B 308 side from the RAM-A 303 to the RAM-B 308. Upon completion of transfer, the CPU-B 308 executes the main program transferred on the RAM-B 310 in step S809. As a result, the image forming apparatus 100 returns to the normal power mode.

On the other hand, when the return processing starts in response to an acquisition request transmitted from the external computer 230 via the network so as to acquire image data in the HDD 307, it is determined in step S805 that the image forming apparatus is not required to return to the normal power mode. The process advances to step S810.

In step S810, the CPU-A 301 supplies electric power to the HDD 307 so as to execute processing corresponding to the return factor determined based on the detection result of the power saving mode return factor detection unit 312. After that, the CPU-A 301 transmits image data in the HDD 307 to the external computer 230.

In step S811, the CPU-A 301 sets a timer used to return to the first power saving mode.

It is checked in step S812 if another job is input, and the image forming apparatus is required to return to the normal power mode. Whether or not another job is input is monitored until the timer set in step S812 reaches a time-out.

If another job is input before the timer reaches a time-out, and it is determined that the image forming apparatus is required to return to the normal power mode, the process advances to step S806. In step S806, the CPU-A 301 turns on the power supply to respective devices on the CPU-B 308 side via the power supply control unit 313. Also, the CPU-A 301 turns on the power supply to the document feeder control unit 201, image reader control unit 202, printer control unit 203, folding device control unit 206, and finisher control unit 207.

On the other hand, if the timer reaches a time-out without input of any job, the power mode transits to the first power saving mode.

As can be seen from the above description, according to this embodiment, in an information processing apparatus which comprises a plurality of arithmetic units and a plurality of storage units, a plurality of main programs and required data are stored in one storage unit upon transition to the power saving mode. As a result, electric power is to be supplied to only one main storage device in the power saving mode, thus suppressing power consumption.

Note that a time required for the CPU-A 301 to transfer the main program on the CPU-B 308 side from the RAM-A 303 to the RAM-B 310 in step S808 is defined as a first time. In this case, the first time is shorter than a second time required to load the OS-B and an application to be executed by the OS-B from the HDD 307 onto the RAM-B 310 in the sequence of FIG. 13.

Therefore, according to this embodiment, upon returning from the power saving mode, since data transfer can be directly made from the RAM in place of the HDD, the return time can be shortened.

A return factor from the power saving mode is checked, and if only one CPU is required to be resumed, control is made not to supply any electric power to unnecessary devices. As a result, the power consumption can be further reduced.

Note that the HDD 307 stores the OS-A and APP-A to be executed by the CPU-A 301 and the OS-B and APP-B to be executed by the CPU-B 308 in this embodiment, but another mode may be adopted. For example, another HDD different from the HDD 307 may be connected to the CPU-B, the HDD 307 may store the OS-A and APP-A, and the other HDD may store the OS-B and APP-B. In this case, upon activating the image forming apparatus 100, the CPU-A 301 loads the OS-A and APP-A from the HDD 307, and the CPU-B 308 loads the OS-B and APP-B from the other HDD.

In this embodiment, the RAM-A 303 comprises a volatile DRAM, and electric power is supplied to the RAM-A 303 in the first power saving mode. However, another mode may be adopted. For example, the RAM-A 303 may comprise a non-volatile flash memory, and power supply to the RAM-A 303 may be cut off in the first power saving mode. Assume that a time required to transfer the main program for the CPU-B stored in the RAM-A to the RAM-B upon returning from the first power saving mode to the normal power mode is shorter than a time required to load the OS-B and APP-B from the HDD 307 onto the RAM-B. In this case, there is no storage unit to which electric power is to be supplied in the first power saving mode, thus further suppressing the power consumption.

In this embodiment, the programs such as the OS-A, OS-B, APP-A, and APP-B are stored in the HDD 307. However, another mode may be adopted. For example, as the data format of stored programs, either a compressed or non-compressed data format may be used. When programs are stored in the HDD 307 in the compressed data format, the CPU-A 301 decompresses the compressed programs, and loads them onto the RAM-A 303 (first main storage device). Likewise, the CPU-B 308 decompresses the compressed programs, and then loads them onto the RAM-B 310 (second main storage device). When the compressed programs are to be decompressed, time is required for the decompression processing. Therefore, the effect of shortening the return time by directly making data transfer from the RAM upon returning from the power saving mode is higher than a case in which the programs are stored in the HDD in the non-compressed data format.

[Second Embodiment]

In the first embodiment, upon transiting to the power saving mode, the main program on the CPU-A side and that on the CPU-B side are collectively stored on the RAM-A on the CPU-A side, thus suppressing the power consumption. However, the present invention is not limited to such specific arrangement. For example, the main program on the CPU-A side may be stored on the RAM-A, and that on the CPU-B side may be stored on the hard disk as a hibernation image. With this arrangement, the capacity of the RAM-A can be suppressed compared to the first embodiment, and the power consumption of the RAM-A can be reduced.

Details of this embodiment will be described below. Note that the arrangement of the image forming apparatus, that of the controller incorporated in the image forming apparatus, that of the controller control unit, and that of the operation unit are the same as those in the first embodiment, and a repetitive description thereof will be avoided.

1. Sequence of Transition Processing upon Transiting to First Power Saving Mode

Figure 9:
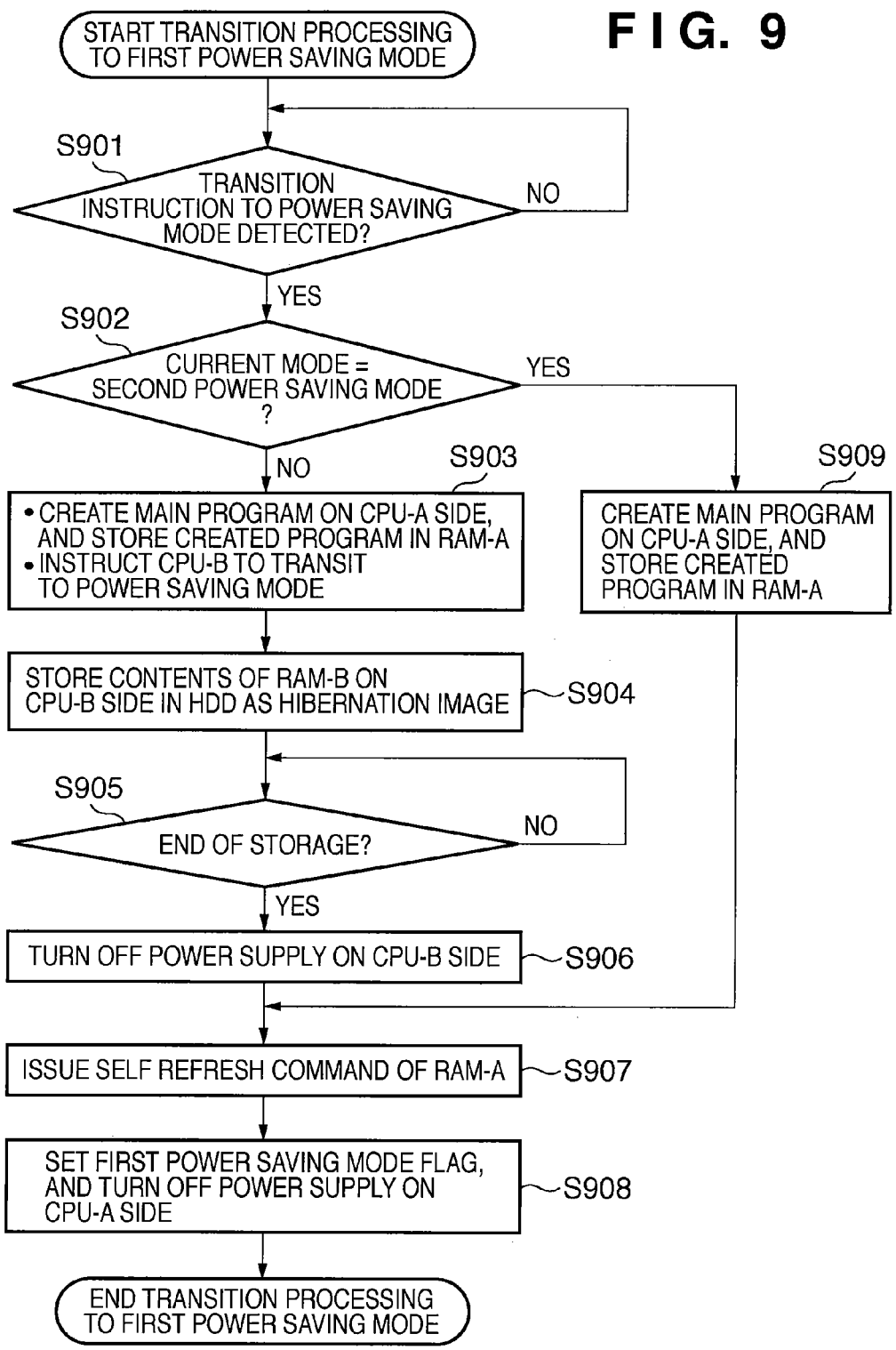
FIG. 9 is a flowchart showing the sequence of transition processing when the image forming apparatus transits to the first power saving mode.

FIG. 9 is a flowchart showing the sequence of transition processing when the image forming apparatus 100 transits to the first power saving mode.

It is checked in step S901 if a condition required to transit to the power saving mode is satisfied. If it is determined that the condition is satisfied, the process advances to step S902.

More specifically, if the user presses the power saving key 404 in the operation unit 205, that instruction is accepted, and it is determined that a transition instruction to the power saving mode is detected. Alternatively, if the image forming apparatus 100 is not in use for a predetermined time period, it is determined that a transition instruction to the power saving mode is detected, and the process advances to step S902.

The CPU-A 301 checks in step S902 if the current mode of the image forming apparatus 100 is the second power saving mode. If it is determined in step S902 that the current mode of the image forming apparatus 100 is not the second power saving mode but the normal power mode, the process advances to step S903.

In step S903, the CPU-A 301 creates a main program which runs on the self OS, and stores it in the RAM-A 303. The CPU-A 301 instructs the CPU-B 308 to transit to the power saving mode.

In step S904, the CPU-B 308 transfers all data created on the RAM-B 310, and stores that image in the HDD 307 as a hibernation image (RAM image). Namely, the CPU-B 308 transfers all data from RAM-B 310 to the HDD 307.

It is checked in step S905 if storage of the hibernation image in the HDD 307 is complete. If it is determined that storage is complete, the process advances to step S906.

In step S906, the CPU-A 301 turns off the power supply on the CPU-B 308 side via the power supply control unit 313. Also, the CPU-A 301 turns off the power supply to the document feeder control unit 201, image reader control unit 202, printer control unit 203, folding device control unit 206, and finisher control unit 207. As a result, the power supply state becomes that shown in FIG. 6A, and the image forming apparatus transits to the second power saving mode.

In step S907, the CPU-A 301 issues a self refresh command to the RAM-A 303 to hold the main program and data of the CPU-A 301 held in the RAM-A 303.

In step S908, the CPU-A 301 sets a first power saving mode flag in the power saving mode return factor detection unit 312, and then turns off the power supply on the CPU-A 301 side via the power supply control unit 313, thus transiting to the first power saving mode.

On the other hand, if it is determined in step S902 that the current mode of the image forming apparatus 100 is the second power saving mode, the process advances to step S909. In step S909, since the hibernation image on the CPU-B 308 side has already been stored in the HDD 307, the CPU-A 301 creates a main program which runs on the self OS, and stores it in the RAM-A 303. After that, the process advances to step S907, and the CPU-A 301 issues a self refresh command to the RAM-A 303 to hold the main program and data of the CPU-A 301 held in the RAM-A 303.

2. Sequence of Return Processing upon Returning to Normal Power Mode

Figure 10:
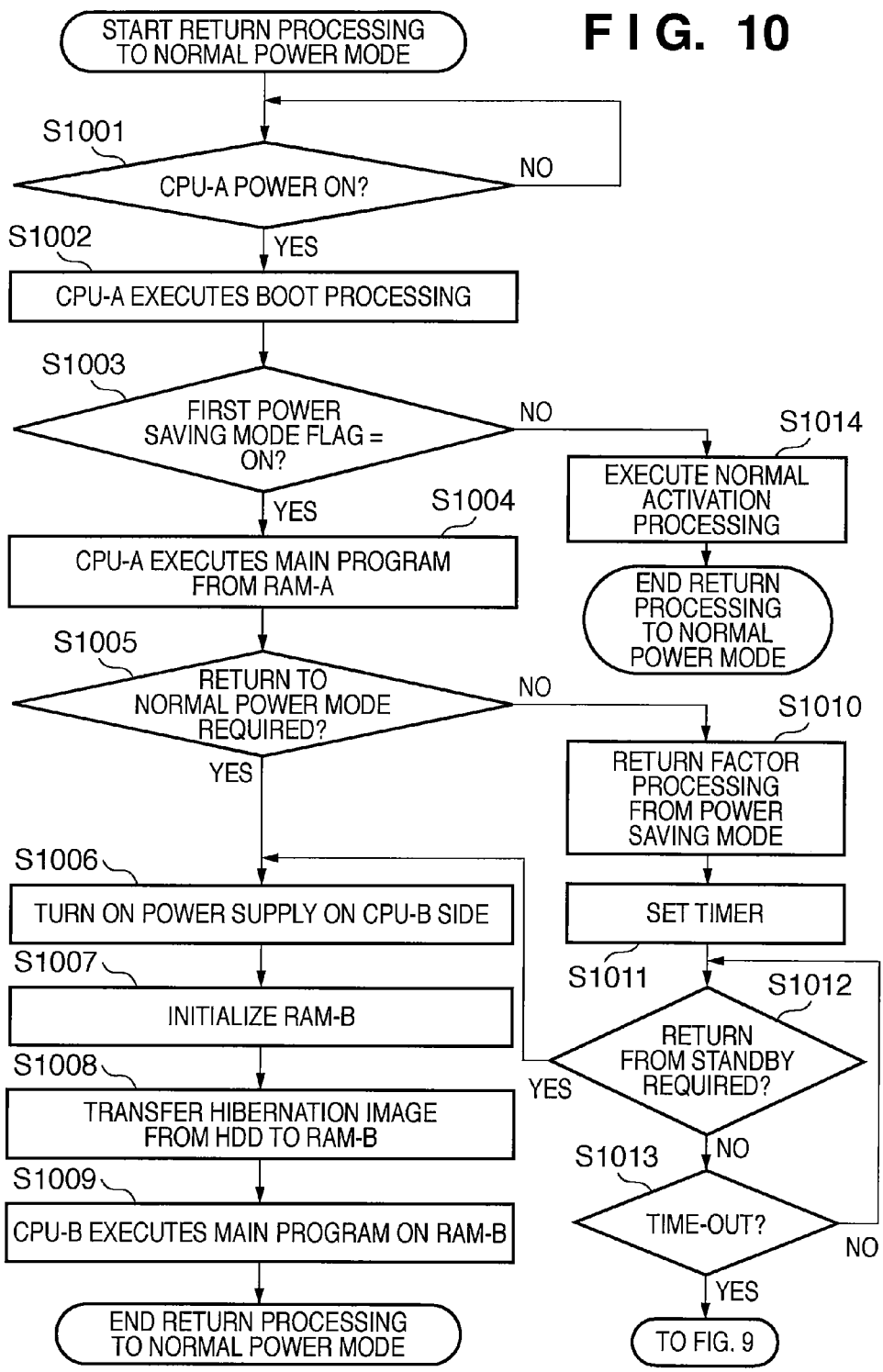
FIG. 10 is a flowchart showing the sequence of return processing when the image forming apparatus returns from the first power saving mode.

FIG. 10 is a flowchart showing the sequence of return processing when the image forming apparatus returns to the normal power mode.

When the user presses a main switch or the power saving key 404 in the operation unit 205, or when the external computer 230 issues an image data acquisition request, the process in step S1001 is executed. More specifically, the power saving mode return factor detection unit 312 supplies electric power to the CPU-A 301 via the power supply control unit 313.

In step S1002, the CPU-A 301 launches a BIOS from the ROM-A 302 to execute boot processing.

The CPU-A 301 checks in step S1003 if the first power saving mode flag in the power saving mode return factor detection unit 312 is ON. If it is determined that the first power saving mode flag is ON, the CPU-A 301 determines return from the first power saving mode, and the process advances to step S1004.

On the other hand, if it is determined in step S1003 that the first power saving mode flag is OFF, the CPU-A 301 determines return from a state in which the AC power supply is OFF, and executes normal activation processing for activating the image forming apparatus 100 using programs in the HDD 307 in step S1014.

In step S1004, the CPU-A 301 executes the self main program held in the RAM-A 303.

In step S1005, the CPU-A 301 checks a return factor based on the detection result of the power saving mode return factor detection unit 312, and determines a mode to which the image forming apparatus is to return based on the checking result.

More specifically, when the return processing starts in response to pressing of the power saving key 404 in the operation unit 205 by the user, it is determined that the operation of the image forming apparatus such as the copy operation is required, and the overall image forming apparatus is controlled to return to the normal power mode. On the other hand, when the return processing starts in response to an acquisition request transmitted from the external computer 230 via the network so as to acquire image data saved in the RAM-A 303 or HDD 307, only the CPU-A 301 side is resumed. That is, the image forming apparatus is controlled to return to the second power saving mode.

For this reason, when the return processing starts upon pressing of the power saving key 404 in the operation unit 205 by the user, it is determined in step S1005 that the image processing apparatus is required to return to the normal power mode, and the process advances to step S1006.

In step S1006, the CPU-A 301 turns on the power supply to respective devices on the CPU-B 308 and the HDD 307 via the power supply control unit 313. Also, the CPU-A 301 turns on the power supply to the document feeder control unit 201, image reader control unit 202, printer control unit 203, folding device control unit 206, and finisher control unit 207.

In step S1007, the CPU-B 308 launches an initial activation program in the ROM-B 309, thereby initializing the RAM-B 310.

In step S1008, the CPU-A 301 (or CPU-B 308) transfers the hibernation image from the HDD 307 to the RAM-B 310.

Upon completion of transfer, in step S1009 the CPU-B 308 executes the main program from the hibernation image transferred onto the RAM-B 310. As a result, the image forming apparatus 100 returns to the normal power mode.

On the other hand, when the return processing starts in response to an acquisition request transmitted from the external computer 230 via the network so as to acquire image data in the HDD 307, it is determined in step S1005 that the image forming apparatus is not required to return to the normal power mode. In this case, the process advances to step S1010, In step S1010, the CPU-A 301 executes processing corresponding to the return factor determined based on the detection result of the power saving mode return factor detection unit 312. In this step, the CPU-A 301 transmits image data in the RAM-A 303 to the external computer 230 without supplying any electric power to the HDD 307.

In step S1011, the CPU-A 301 sets a timer used to return to the first power saving mode.

It is checked in step S1012 if another job is input, and the image forming apparatus is required to return to the normal power mode. Whether or not another job is input is monitored until the timer set in step S1011 reaches a time-out.

If another job is input before the timer reaches a time-out, and it is determined that the image forming apparatus is required to return to the normal power mode, the process advances to step S1006. In step S1006, the CPU-A 301 turns on the power supply to respective devices on the CPU-B 308 side via the power supply control unit 313. Also, the CPU-A 301 turns on the power supply to the document feeder control unit 201, image reader control unit 202, printer control unit 203, folding device control unit 206, and finisher control unit 207.

On the other hand, if the timer reaches a time-out without input of any job, the power mode transits to the first power saving mode.

As can be seen from the above description, according to this embodiment, the RAM-A whose power ON state is to be held stores only the main program of one CPU although the return time increases slightly. Hence, the capacity of the RAM-A can be reduced. As a result, the power consumption in the power saving mode can be reduced.

[Third Embodiment]

In each of the above embodiments, when the user presses the power saving key or when the image forming apparatus is not in use for a predetermined time period, it is determined that a transition instruction to the power saving mode is detected, and the transition processing to the first power saving mode starts. However, the present invention is not limited to this.

For example, a transition instruction to the first power saving mode and that to the second power saving mode may be independently determined, and different transition processing may be executed in each case.

More specifically, when the image forming apparatus is not in use for a predetermined time period in the normal power mode, it is determined that a transition instruction to the second power saving mode is detected, and transition processing to the second power saving mode starts. On the other hand, when the user presses the power saving key, or when the image forming apparatus is not in use for a predetermined time period in the second power saving mode, it is determined that a transition instruction to the first power saving mode is detected, and transition processing to the first power saving mode starts. In this manner, since the different transition processing is executed, when the image forming apparatus is not in use for a predetermined time period in the normal power mode, it does not transit up to the first power saving mode, thus shortening the return time required to return to the normal power mode. Details of this embodiment will be described below.

Figure 11:
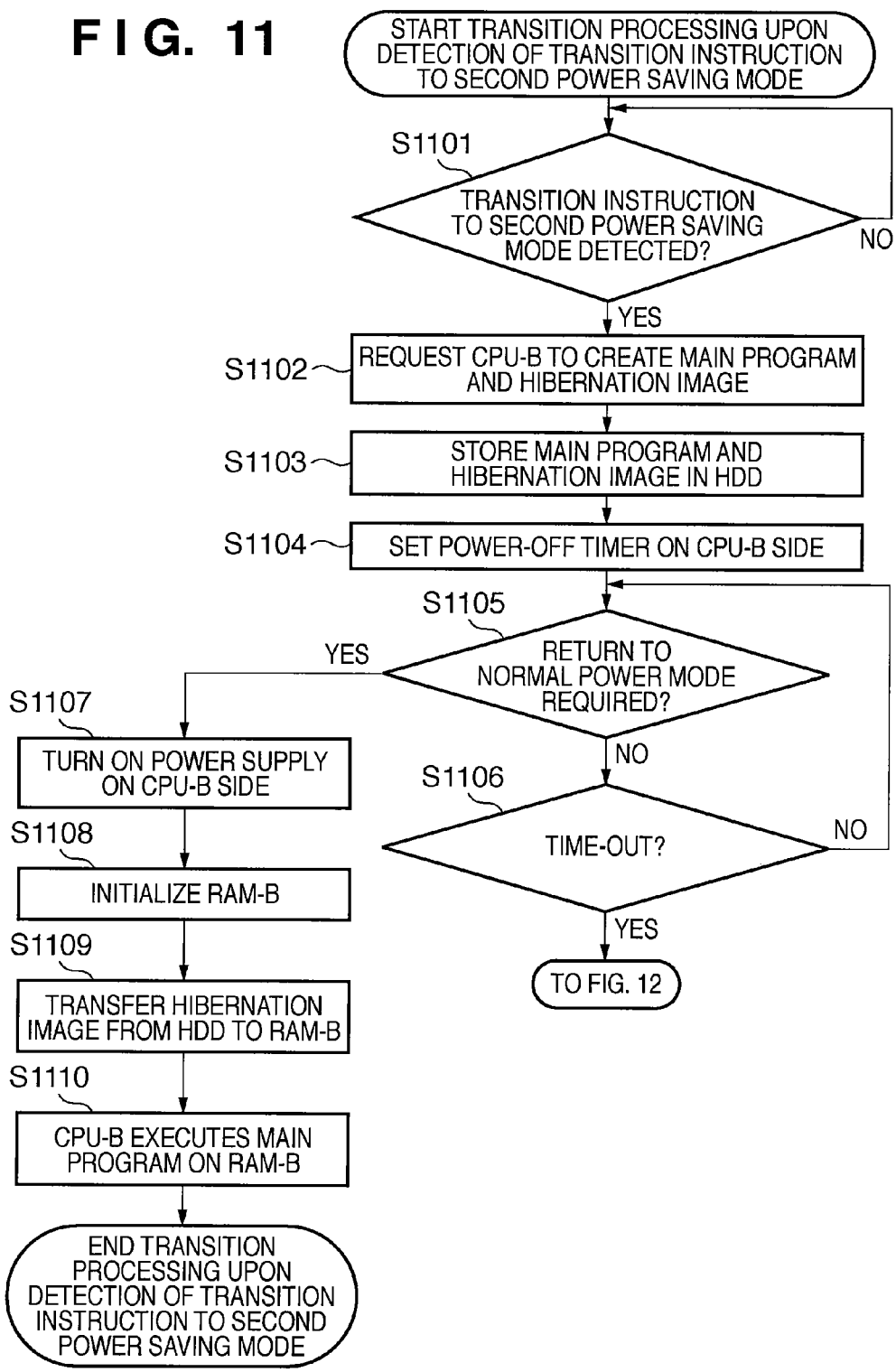
FIG. 11 is a flowchart showing the sequence of transition processing in the image forming apparatus upon detection of a transition instruction to the second power saving mode.

1. Sequence of Transition Processing upon Detection of Transition Instruction to Second Power Saving Mode FIG. 11 is a flowchart showing the sequence of transition processing in the image processing apparatus 100 upon detection of a transition instruction to the second power saving mode.

It is checked in step S1101 if a condition required to transit to the second power saving mode is satisfied. If it is determined that the condition is satisfied, the process advances to step S1102.

More specifically, when the image forming apparatus 100 is not in use for a predetermined time period in the normal power mode, it is determined that a transition instruction to the second power saving mode is detected, and the process advances to step S1102.

In step S1102, the CPU-A 301 requests the CPU-B 308 to create a main program and hibernation image on the CPU-B 308 side.

In step S1103, the CPU-B 308 creates a main program and hibernation image on the CPU-B side, and stores them in the HDD 307.

After the main program and hibernation image on the CPU-B 308 side are stored in the HDD 307, the CPU-A 301 turns off the power supply to respective devices on the CPU-B 308 side via the power supply control unit 313 in step S1104. Also, the CPU-A 301 turns off the power supply to the document feeder control unit 201, image reader control unit 202, printer control unit 203, folding device control unit 206, and finisher control unit 207. As a result, the power supply state becomes that shown in FIG. 6A, and the image forming apparatus 100 transits to the second power saving mode.

At the same time, the CPU-A 301 sets a timer used to transit to the first power saving mode.

It is checked in step S1105 if another job is input, and the image forming apparatus is required to return to the normal power mode. Whether or not another job is input is monitored until the timer set in step S1104 reaches a time-out.

If it is determined in step S1106 that the timer reaches a time-out without input of any job, the transition processing to the first power saving mode shown in FIG. 12 starts.

If another job is input before the timer reaches a time-out, and it is determined that the image processing apparatus is required to return to the normal power mode, the process advances to step S1107. In step S1107, the CPU-A 301 turns on the power supply to respective devices on the CPU-B 308 side via the power supply control unit 313. Also, the CPU-A 301 turns on the power supply to the document feeder control unit 201, image reader control unit 202, printer control unit 203, folding device control unit 206, and finisher control unit 207.

In step S1108, the CPU-B 308 launches an initial activation program in the ROM-B 309 to initialize the RAM-B 310.

In step S1109, the CPU-A 301 (or CPU-B 308) transfers the hibernation image from the HDD 307 to the RAM-B 310.

Upon completion of transfer, in step S1110 the CPU-B 308 executes the main program from the hibernation image transferred onto the RAM-B 310. As a result, the image forming apparatus 100 returns to the normal power mode.

2. Sequence of Transition Processing upon Detection of Transition Instruction to First Power Saving Mode FIG. 12 is a flowchart showing the sequence of transition processing in the image forming apparatus 100 upon detection of a transition instruction to the first power saving mode.

It is checked in step S1201 if a condition required to transit to the first power saving mode is satisfied. If it is determined that the condition is satisfied, the process advances to step S1202.

More specifically, if the user presses the power saving key 404 in the operation unit 205, that instruction is accepted, and it is determined that a transition instruction to the first power saving mode is detected. Alternatively, if the image forming apparatus 100 is not in use for a predetermined time period after transition to the second power saving mode, it is determined that a transition instruction to the first power saving mode is detected, and the process advances to step S1202.

The CPU-A 301 checks in step S1202 if the current mode of the image forming apparatus 100 is the second power saving mode. If it is determined in step S1202 that the current mode of the image forming apparatus 100 is not the second power saving mode but the normal power mode, the process advances to step S1203.

In step S1203, the CPU-A 301 creates a main program which runs on the self OS, and stores it in the RAM-A 303. The CPU-A 301 requests the CPU-B 308 to create a main program on the CPU-B 308 side.

In step S1204, the CPU-A 301 acquires the main program on the CPU-B side, and stores it in the RAM-A 303. The CPU-A 301 checks in step S1205 if storage of the main program on the CPU-B 308 side in the RAM-A 303 is complete. If it is determined that storage of the main program in the RAM-A 303 is complete, the process advances to step S1206.

In step S1206, the CPU-A 301 turns off the power supply to respective devices on the CPU-B 308 side via the power supply control unit 313. Also, the CPU-A 301 turns off the power supply to the document feeder control unit 201, image reader control unit 202, printer control unit 203, folding device control unit 206, and finisher control unit 207.

In step S1207, the CPU-A 301 issues a self refresh command to the RAM-A 303 to hold the main programs and data of both the CPU-A 301 and CPU-B 308 held in the RAM-A 303.

In step S1208, the CPU-A 301 sets a first power saving mode flag in the power saving mode return factor detection unit 312, and then turns off the power supply on the CPU-A 301 side via the power supply control unit 313, thus transiting to the first power saving mode.

On the other hand, if it is determined in step S1202 that the current mode of the image forming apparatus 100 is the second power saving mode, the process advances to step S1209. In step S1209, since the main program on the CPU-B side has already been stored in the HDD 307, the CPU-A 301 creates a main program which runs on the self OS, and stores it in the RAM-A 303.

Furthermore, in step S1210 the CPU-A 301 acquires the main program on the CPU-B 308 side from the HDD 307, and stores it in the RAM-A 303. After that, the process advances to step S1207, and the CPU-A 301 issues a self refresh command to the RAM-A 303 to hold the main programs and data of both the CPU-A 301 and CPU-B 308 held in the RAM-A 303.

3. Sequence of Return Processing upon Returning to Normal Power Mode

In case of this embodiment, the sequence of return processing upon returning from the first power saving mode is the same as that in FIG. 8, and a repetitive description thereof will be avoided.

As can be seen from the above description, according to this embodiment, the transition instruction to the first power saving mode, and that to the second power saving mode are independently determined, and the different transition processing is executed in each case. As a result, when the image forming apparatus is not in use for a predetermined time period in the normal power mode, it does not transit up to the first power saving mode, and the return time required to return to the normal power mode can be shortened.

Fourth Embodiment

In the first embodiment, upon transition to the power saving mode, the CPU-A creates a main program on the CPU-A side, and the CPU-B creates that on the CPU-B side. However, the present invention is not limited to such specific arrangement. For example, the CPU-A may create both the main program on the CPU-A side and that on the CPU-B side.

Details of this embodiment will be described below. Note that the arrangement of the image forming apparatus, that of the controller incorporated in the image forming apparatus, that of the controller control unit, and that of the operation unit are the same as those in the first embodiment, and a repetitive description thereof will be avoided.

1. Sequence of Transition Processing upon Transiting to First Power Saving Mode

FIG. 15 is a flowchart showing the sequence of transition processing when the image forming apparatus 100 transits to the first power saving mode.

It is checked in step S1501 if a condition required to transit to the power saving mode is satisfied. If it is determined that the condition is satisfied, the process advances to step S1502.

More specifically, if the user presses the power saving key 404 in the operation unit 205, that instruction is accepted, and it is determined that a transition instruction to the power saving mode is detected. Then, the process advances to step S1502. Alternatively, if the image forming apparatus 100 is not in use for a predetermined time period, it is determined that a transition instruction to the power saving mode is detected, and the process advances to step S1502.

The CPU-A 301 checks in step S1502 if the current mode of the image forming apparatus 100 is the second power saving mode. If it is determined in step S1502 that the current mode of the image forming apparatus 100 is not the second power saving mode but the normal power mode, the process advances to step S1503.

In step S1503, the CPU-A 301 creates a main program which runs on the self OS, and stores it in the RAM-A 303. Creation of the program is implemented when the CPU-A 301 transfers a main program which runs on the OS on the CPU-A 301 side from the HDD 307 to the RAM-A 303.

In step S1504, the CPU-A 301 turns off the power supply on the CPU-B 308 side via the power supply control unit 313. Also, the CPU-A 301 turns off the power supply to the document feeder control unit 201, image reader control unit 202, printer control unit 203, folding device control unit 206, and finisher control unit 207. As a result, the power supply state becomes that shown in FIG. 6A, and the image forming apparatus transits to the second power saving mode.

In step S1505, the CPU-A 301 creates a main program which runs on the OS of the CPU-B 308, and stores it in the RAM-A 303 to which power supply is maintained. Creation of the main program is implemented by decompressing data (compressed main program) stored in the HDD 307. Note that step S1505 is executed after step S1504 in this embodiment. Alternatively, step S1504 may be executed after step S1505.

In step S1506, the CPU-A 301 issues a self refresh command to the RAM-A 303 to hold the main programs and data of both the CPU-A 301 and CPU-B 308 held in the RAM-A 303.

In step S1507, the CPU-A 301 sets a first power saving mode flag in the power saving mode return factor detection unit 312, and then turns off the power supply on the CPU-A 301 side via the power supply control unit 313, thus transiting to the first power saving mode.

On the other hand, if it is determined in step S1502 that the current mode of the image forming apparatus 100 is the second power saving mode, the process advances to step S1508. In step S1508, since the main program on the CPU-B 308 side has already been stored in the RAM-A 303, the CPU-A 301 creates a main program which runs on the self OS, and stores it in the RAM-A 303 whose power supply state is maintained. After that, the process advances to step S1506, and the CPU-A 301 issues a self refresh command to the RAM-A 303 to hold the main programs and data of both the CPU-A 301 and CPU-B 308 held in the RAM-A 303.

2. Sequence of Return Processing upon Returning to Normal Power Mode

In case of this embodiment, the sequence of return processing upon returning from the first power saving mode is the same as that in FIG. 8, and a repetitive description thereof will be avoided.

As can be seen from the above description, according to this embodiment, when the CPU-A creates a main program on the CPU-A side and that on the CPU-B side, the CPU-B can be turned off earlier. As a result, the power consumption in the power saving mode can be reduced.

[Other Embodiments]

Note that the present invention may be applied to either a system constituted by a plurality of devices (e.g., a host computer, interface device, reader, and printer), or an apparatus consisting of a single device (e.g., a copying machine or facsimile apparatus).

The objects of the present invention are also achieved by supplying a storage medium, which records a program code of software that implements the functions of the aforementioned embodiments to the system or apparatus. In this case, the functions are implemented when a computer (or a CPU or MPU) of the system or apparatus reads out and executes the program code stored in the storage medium. Note that the storage medium that stores the program code constitutes the present invention in such case.

As the storage medium for supplying the program code, for example, a Floppy® disk, hard disk, optical disk, magneto-optical disk, CD-ROM, CD-R, magnetic tape, nonvolatile memory card, and ROM may be used.

The present invention is not limited to the case in which the functions of the aforementioned embodiments are implemented when the computer executes the readout program code. For example, the present invention also includes a case wherein an OS (operating system) running on a computer may execute some or all of actual processes based on an instruction of the program code to implement the functions of the aforementioned embodiments.

Furthermore, the present invention also includes a case wherein the functions of the aforementioned embodiments are implemented after the program code read out from the storage medium is written in a memory equipped on a function expansion board or unit, which is inserted in or connected to the computer. That is, the present invention includes a case wherein after the program code is written in the memory, a CPU or the like equipped on the function expansion board or unit executes some or all of actual processes based on an instruction of the program code, so as to implement the functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus having a first power mode and a second power mode in which consumption power is lower than consumption power in the first power mode, comprising:

a nonvolatile program storage unit configured to store a first program and a second program, both the first program and the second program being executed in the first power mode;

a first arithmetic unit configured to execute, in the first power mode, the first program which is loaded to a first storage unit from the nonvolatile program storage unit;

a second arithmetic unit configured to execute, in the first power mode, the second program which is loaded to a volatile second storage unit from the nonvolatile program storage unit;

a transferring unit configured to transfer, if a condition required to transit to the second power mode is satisfied, the second program from the nonvolatile program storage unit to the first storage unit; and a control unit configured to stop, if the condition required to transit to the second power mode is satisfied, power supply to the volatile second storage unit and control the information processing apparatus so as to transit to the second power mode, wherein if a condition required to return to the first power mode is satisfied, the control unit resumes the power supply to the volatile second storage unit and controls the information processing apparatus so as to transit to the first power mode, the transferring unit transfers the second program stored in the first storage unit to the volatile second storage unit, and the second arithmetic unit executes the second program in accordance with transferring the second program to the volatile second storage unit.

2. The information processing apparatus according to claim 1, wherein an access speed of the first arithmetic unit to the first storage unit is higher than an access speed of the first arithmetic unit to the nonvolatile program storage unit, and an access speed of the second arithmetic unit to the volatile second storage unit is higher than an access speed of the second arithmetic unit to the nonvolatile program storage unit.

3. The information processing apparatus according to claim 1, wherein time required to transfer the second program stored in the first storage unit to the volatile second storage unit is shorter than time required to load the second program stored in the nonvolatile program storage unit to the volatile second storage unit.

4. The information processing apparatus according to claim 1, wherein the nonvolatile program storage unit comprises a first program storage unit configured to store the first program and a second program storage unit configured to store the second program, the first arithmetic unit loads the first program from the first program storage unit to the first storage unit, and the second arithmetic unit loads the second program from the second program storage unit to the volatile second storage unit.

5. The information processing apparatus according to claim 1, wherein the first program and the second program are stored in the nonvolatile program storage unit in a compressed state, the first arithmetic unit loads the first program to the first storage unit after decompressing the first program stored in the compressed state, and the second arithmetic unit loads the second program to the volatile second storage unit after decompressing the second program stored in the compressed state.

6. The information processing apparatus according to claim 1, wherein the first storage unit is a volatile storage unit, and wherein the control unit stops the power supply to the volatile second storage unit while continuing power supply to the first storage unit after the transferring unit transfers the second program to the first storage unit.

7. The information processing apparatus according to claim 1, wherein the first arithmetic unit executes the first program stored in the first storage unit if the condition required to return to the first power mode is satisfied.

8. An information processing method in an information processing apparatus, which has a first power mode and a second power mode in which consumption power is lower than consumption power in the first power mode, wherein the information processing apparatus comprises a nonvolatile program storage unit configured to store a first program and a second program, both the first program and the second program being executed in the first power mode, a first arithmetic unit configured to execute, in the first power mode, the first program which is loaded to a first storage unit from the nonvolatile program storage unit, and a second arithmetic unit configured to execute, in the first power mode, the second program which is loaded to a volatile second storage unit from the nonvolatile program storage unit, the method comprising:

transferring, if a condition required to transit to the second power mode is satisfied, the second program from the nonvolatile program storage unit to the first storage unit;

stopping, if the condition required to transit to the second power mode is satisfied, power supply to the volatile second storage unit and controlling the information processing apparatus so as to transit to the second power mode;

resuming, if a condition required to return to the first power mode is satisfied, the power supply to the volatile second storage unit and controlling the information processing apparatus so as to transit to the first power mode;

transferring the second program stored in the first storage unit to the volatile second storage unit in accordance with transiting the information processing apparatus to the first power mode; and executing the second program in accordance with transferring the second program to the volatile second storage unit.

* * * * *